United States Patent
Wang et al.

(10) Patent No.: US 11,748,742 B2
(45) Date of Patent: Sep. 5, 2023

(54) INFORMATION PROCESSING DEVICE AND INFORMATION PROCESSING SYSTEM

(71) Applicant: SONY CORPORATION, Tokyo (JP)

(72) Inventors: Yuhu Wang, Tokyo (JP); Shino Ogasahara, Tokyo (JP); Tsutomu Nakatsuru, Tokyo (JP)

(73) Assignee: SONY CORPORATION, Tokyo (JP)

( * ) Notice: Subject to any disclaimer, the term of this patent is extended or adjusted under 35 U.S.C. 154(b) by 161 days.

(21) Appl. No.: 16/964,833

(22) PCT Filed: Dec. 28, 2018

(86) PCT No.: PCT/JP2018/048425
§ 371 (c)(1),
(2) Date: Jul. 24, 2020

(87) PCT Pub. No.: WO2019/155793
PCT Pub. Date: Aug. 15, 2019

(65) Prior Publication Data
US 2021/0065162 A1    Mar. 4, 2021

(30) Foreign Application Priority Data

Feb. 8, 2018    (JP) .................................. 2018-020644

(51) Int. Cl.
*G06Q 20/34*    (2012.01)
*G06Q 20/10*    (2012.01)

(52) U.S. Cl.
CPC ......... *G06Q 20/342* (2013.01); *G06Q 20/105* (2013.01); *G06Q 20/356* (2013.01)

(58) Field of Classification Search
CPC .. G06Q 20/342; G06Q 20/105; G06Q 20/356; G06Q 20/34; G06Q 20/12; G06Q 20/14; G06Q 20/357; G06K 7/00
See application file for complete search history.

(56) References Cited

U.S. PATENT DOCUMENTS 7,319,986 B2 * 1/2008 Praisner ................ G07F 7/1008
705/40
9,792,632 B2 * 10/2017 Betancourt ........ G06Q 30/0601
(Continued)

FOREIGN PATENT DOCUMENTS

CA    2901725 A1 * 10/2013 ............. G06F 21/31
JP    01-206487 A    8/1989
(Continued)

OTHER PUBLICATIONS

Aigbe et al.: An Immediate Real Time Detection and Prevention of Doubl-Spending in Electronic Cash payment System, Jul. 2015, International Journal of Computer Application, pp. 32-39. (Year: 2015).*

(Continued)

*Primary Examiner* — Bijendra K Shrestha
(74) *Attorney, Agent, or Firm* — CHIP LAW GROUP

(57) ABSTRACT

The present invention relates to the provision of an information processing device that can smoothly perform the migration of a system. An information processing device includes a processing unit including a first function of executing processing that uses service information stored in a recording medium, and a second function of executing processing that uses identification information regarding a service that is stored in a recording medium, and a determination unit configured to determine processing to be executed by the processing unit, on the basis of a request from an external device. In the information processing device, the processing unit executes processing determined on the basis of the request, and the first function is invalidated on the basis of an invalidation request from an external device.

9 Claims, 12 Drawing Sheets

(56) References Cited

U.S. PATENT DOCUMENTS

| | | | | |
|---|---|---|---|---|
| 10,178,275 | B2 * | 1/2019 | Araki | H04N 1/00344 |
| 10,246,055 | B2 * | 4/2019 | Farges | H04W 4/40 |
| 2009/0106249 | A1 * | 4/2009 | Saito | H04N 1/4426 |
| | | | | 707/999.009 |
| 2014/0164489 | A1 * | 6/2014 | Gopal | H04L 67/1095 |
| | | | | 709/213 |
| 2017/0235901 | A1 * | 8/2017 | Johnson | G06Q 10/06 |
| | | | | 705/2 |
| 2018/0270392 | A1 * | 9/2018 | Araki | H04N 1/00344 |

FOREIGN PATENT DOCUMENTS

| | | | | | |
|---|---|---|---|---|---|
| JP | 2002-099847 | A | | 4/2002 | |
| JP | 2003-091687 | A | | 3/2003 | |
| JP | 200391687 | A | * | 3/2003 | G06Q 50/31 |
| JP | 2003091687 | A | * | 3/2003 | G06Q 50/31 |
| JP | 2004258740 | A | | 9/2004 | |
| JP | 2006215699 | A | * | 8/2006 | G06F 21/20 |
| JP | 2008186069 | A | * | 8/2008 | G06Q 50/32 |
| JP | 2009-277082 | A | | 11/2009 | |

OTHER PUBLICATIONS

Aigbe et al.: An Immediate Real Time Detection and Prevention of Double-Spending in Electronic Cash Payment System, Jul. 2015, International Journal of Computer Application, pp. 32-39. (Year: 2015).*

Bai et al.: Picking Up My Tab: Understanding and Mitigating Synchronized Token Lifting and Spending in Mobile Payment, Aug. 2017, 26th USENIX Security Symposium, Canada, USENIX Asociation, pp. 593-608 (Year: 2017).*

Oracle: Sending Invalidation Requests, 2006, pp. 1-25 (Year: 2006).*

International Search Report and Written Opinion of PCT Application No. PCT/JP2018/048425, dated Mar. 12, 2019, 07 pages of ISRWO.

* cited by examiner

INFORMATION PROCESSING DEVICE AND INFORMATION PROCESSING SYSTEM

CROSS REFERENCE TO RELATED APPLICATIONS

This application is a U.S. National Phase of International Patent Application No. PCT/JP2018/048425 filed on Dec. 28, 2018, which claims priority benefit of Japanese Patent Application No. JP 2018-020644 filed in the Japan Patent Office on Feb. 8, 2018. Each of the above-referenced applications is hereby incorporated herein by reference in its entirety.

TECHNICAL FIELD

The present disclosure relates to an information processing device and an information processing system.

BACKGROUND ART

Various services that use an information processing device such as an IC card have been currently proposed.

Regarding the above-described technology, for example, Patent Document 1 described below discloses a technology in which a service is basically provided in an online state, but the service is allowed to be provided even in an offline state in a case where a predetermined condition is satisfied. Furthermore, Patent Document 2 described below discloses a technology of an electronic payment system in which payment can be made even in an offline state, and in an online state, online side payment information and offline side payment information are synchronized.

CITATION LIST

Patent Document

Patent Document 1: Japanese Patent Application Laid-Open No. 2009-277082
Patent Document 2: Japanese Patent Application Laid-Open No. S63-032177

SUMMARY OF THE INVENTION

Problems to be Solved by the Invention

As the above-described service, there is an example in which processing that uses service information included in an information processing device such as an IC card is executed. A situation in which processing that uses service information is executed will also be hereinafter referred to as offline. Furthermore, there is also an example in which processing that uses an ID included in an information processing device is executed. A situation in which processing that uses an ID is executed will also be hereinafter referred to as online. A case where an offline system is migrated to an online system is assumed.

In view of the foregoing, the present disclosure proposes an information processing device and an information processing system that are novel and improved, and can smoothly perform the migration of a system.

Solutions to Problems

According to the present disclosure, there is provided an information processing device including a processing unit including a first function of executing processing that uses service information stored in a recording medium, and a second function of executing processing that uses identification information regarding a service that is stored in a recording medium, and a determination unit configured to determine processing to be executed by the processing unit, on the basis of a request from an external device. In the information processing device, the processing unit executes processing determined on the basis of the request, and the first function is invalidated on the basis of an invalidation request from an external device.

Furthermore, according to the present disclosure, there is provided an information processing device including a processing unit including a first function of executing processing that uses service information stored in a communication target external device, and a second function of executing processing that uses identification information regarding a service that is stored in the external device, and a determination unit configured to determine processing to be executed by the processing unit, on the basis of information acquired from the external device. In the information processing device, the processing unit executes processing determined on the basis of the acquired information.

Furthermore, according to the present disclosure, there is provided an information processing system including a first information processing device and a second information processing device. In the information processing system, the first information processing device includes a first processing unit including a first function of executing processing that uses service information stored in a recording medium, and a second function of executing processing that uses identification information regarding a service that is stored in a recording medium, and a first determination unit configured to determine processing to be executed by the first processing unit, on the basis of a request from an external device, the first processing unit executes processing determined on the basis of the request, the first function is invalidated on the basis of an invalidation request from an external device, the second information processing device includes a second processing unit including a first function of executing processing that uses service information stored in a communication target external device, and a second function of executing processing that uses identification information regarding a service that is stored in the external device, and a second determination unit configured to determine processing to be executed by the second processing unit, on the basis of information acquired from the external device, and the second processing unit executes processing determined on the basis of the acquired information.

Furthermore, according to the present disclosure, there is provided an information processing system including a first information processing device and a second information processing device. In the information processing system, the first information processing device includes a first processing unit including a first function of executing processing that uses service information stored in a recording medium, and a second function of executing processing that uses identification information regarding a service that is stored in a recording medium, the first function is invalidated, and the second information processing device includes a second processing unit including a function of executing processing that uses identification information regarding a service that is stored in a communication target external device.

Effects of the Invention

As described above, according to the present disclosure, the migration of a system can be smoothly performed.

Note that the above-described effect is not always limitative, and together with the above-described effect or in place of the above-described effect, any of the effects described in this specification, or other effects recognized from this specification may be caused.

MODE FOR CARRYING OUT THE INVENTION

Figure 1:
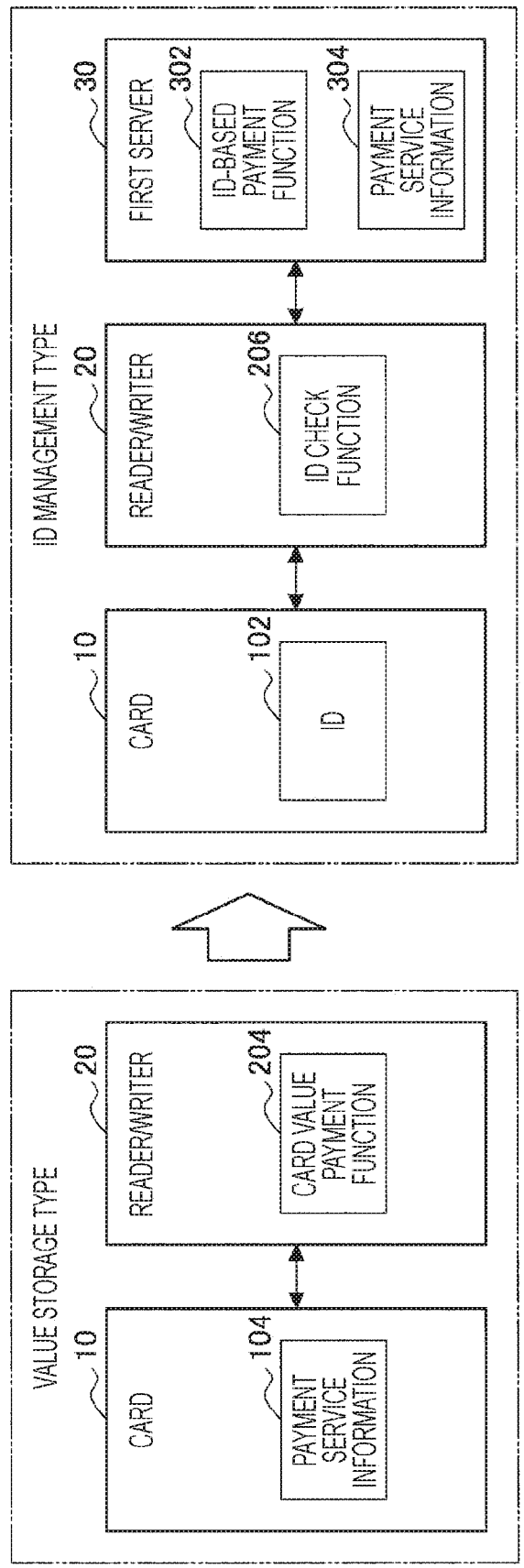
FIG. 1 is an explanatory diagram illustrating a configuration example of an information processing system according to the present embodiment.

Hereinafter, a preferred embodiment of the present disclosure will be described in detail with reference to the attached drawings. Note that, in this specification and the drawings, the redundant description will be omitted by allocating the same reference numerals to the components having substantially the same functional configuration.

Note that the description will be given in the following order.

Figure 2:
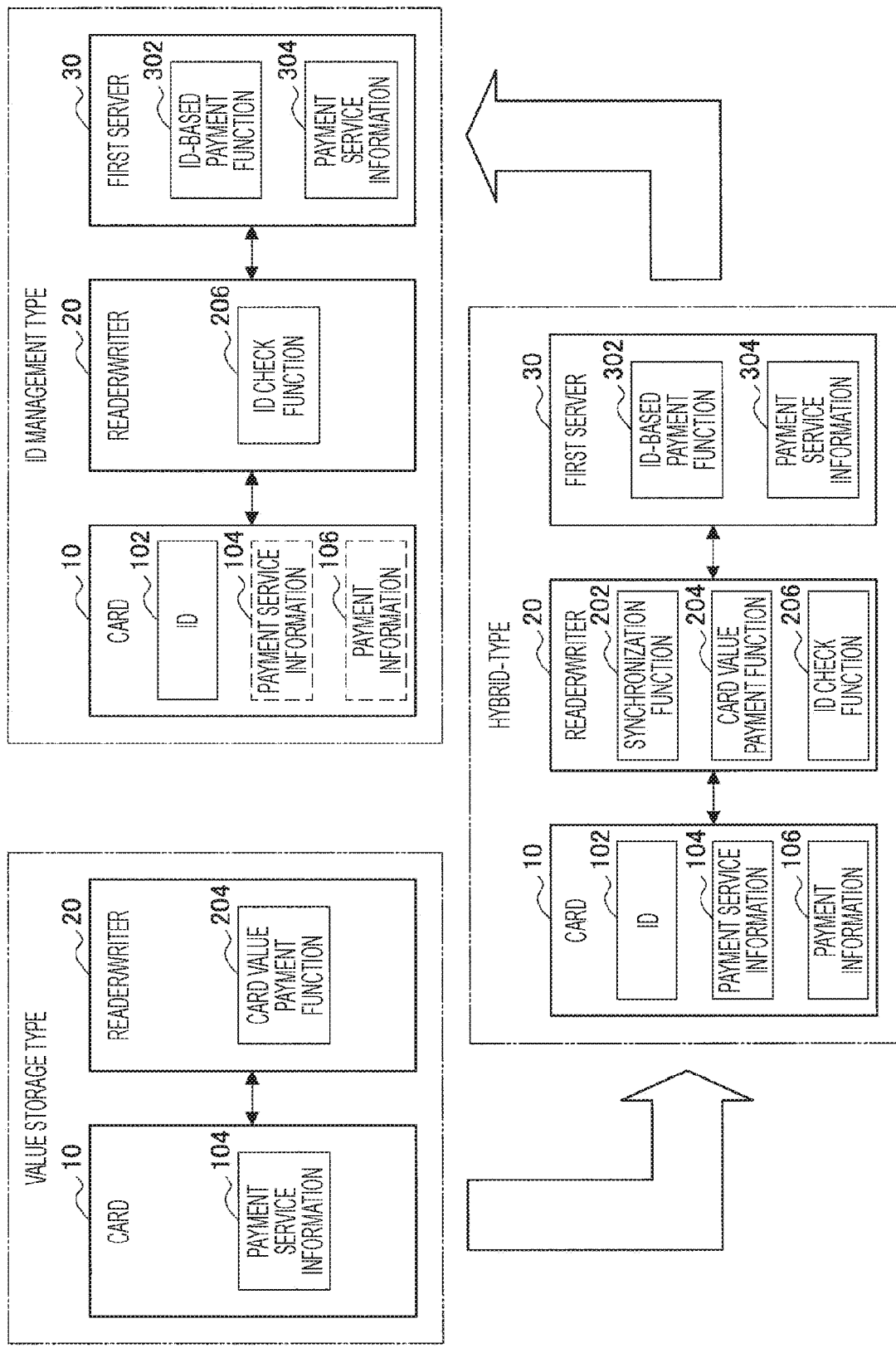
FIG. 2 is an explanatory diagram illustrating a configuration example of an information processing system according to the embodiment.

1. Information Processing System According to Present Embodiment
2. Card According to Present Embodiment
2.1. Functional Configuration Example
2.2. Hardware Configuration Example
3. Reader/Writer According to Present Embodiment
3.1. Functional Configuration Example
3.2. Hardware Configuration Example
4. Operation Example
4.1. Offline Payment Processing
4.2. Online Payment Processing (Without Synchronization)
4.3. Online Payment Processing (With Synchronization)
4.4. Migration Procedure
5. Conclusion 1. Information Processing System According to Present Embodiment Hereinafter, an information processing system according to the present embodiment will be described with reference to FIGS. 1 and 2. FIG. 1 is an explanatory diagram illustrating a configuration example of the information processing system according to the present embodiment in states before and after migration. FIG. 2 is an explanatory diagram illustrating a configuration example of an information processing system according to the present embodiment during migration. Note that, in the information processing system, a case where the information processing device (first information processing device) according to the present embodiment is an integrated circuit (IC) card is used as a main example. Furthermore, the information processing device (first information processing device) according to the present embodiment is not limited to an IC card.

As illustrated on the left side of FIG. 1, the information processing system according to the present embodiment typically has a configuration including a card 10 and a reader/writer 20, for example. Furthermore, as illustrated on the right side of FIG. 1, the information processing system may have a configuration including the card 10, the reader/writer 20, and a first server 30.

Note that the configuration of the information processing system according to the present embodiment is not limited to the example illustrated in FIG. 1. For example, the information processing system according to the present embodiment may include a plurality of cards 10. Furthermore, the information processing system according to the present embodiment may include a plurality of reader/writers 20, and may include a plurality of first servers 30.

The card 10 and the reader/writer 20 perform communication by near field communication (NFC) such as Type-A, Type-B, or Type-F, for example.

Note that, in the information processing system according to the present embodiment, the card 10 and the reader/writer 20 may perform communication by "wireless communication of an arbitrary communication method such as wireless communication that uses IEEE802.15.1 such as Bluetooth Low Energy (BLE), wireless communication that uses IEEE802.11, or infrared communication", or "wired communication that uses communication performed via a universal serial bus (USB) or a communication interface that is based on the ISO7816 standard, or the like", for example.

The first server 30 and the reader/writer 20 are connected in a wireless or wired manner via a network, for example, and perform communication by communication performed via the network (hereinafter, will also be referred to as network communication). Examples of the network according to the present embodiment include a wired network such as a local area network (LAN) or a wide area network (WAN), a wireless network such as a wireless local area network (WLAN), or the Internet that uses a communication protocol such as a Transmission Control Protocol/Internet Protocol (TCP/IP).

Note that, in the information processing system according to the present embodiment, the first server 30 and the reader/writer 20 can directly perform communication not via a network.

The first server 30 and the card 10 perform communication via the reader/writer 20. That is, in the information processing system according to the present embodiment, the reader/writer 20 functions as a relay device that relays communication between the first server 30 and the card 10.

The information processing system illustrated on the left side of FIG. 1 includes the card 10 including payment service information 104, and the reader/writer 20 including a card value payment function 204. The payment service information 104 refers to information regarding a payment service, and refers to a value being a currency or data having a value equivalent to a currency, a payment log, and the like, for example. The card value payment function 204 is a function for the reader/writer 20 executing payment processing for the payment service information 104.

The information processing system including the above-described components will also be hereinafter referred to as a value storage type information processing system. The configuration of the value storage type information processing system is a configuration for executing payment processing between the card 10 and the reader/writer 20 in an offline environment.

Furthermore, the card 10 of the value storage type information processing system will also be hereinafter referred to as a value storage type card 10. Furthermore, the reader/writer 20 of the value storage type information processing system will also be hereinafter referred to as a value storage type reader/writer 20.

The information processing system illustrated on the right side of FIG. 1 includes the card 10 including an ID 102, the reader/writer 20 including an ID check function 206, and the first server 30 including an ID-based payment function 302 and payment service information 304. The ID 102 is an ID allocated to every service. The ID check function 206 is a function for the reader/writer 20 acquiring the ID 102 from the card 10. The ID-based payment function 302 is a function for executing payment processing for the payment service information 304 associated with the ID 102.

The information processing system including the above-described components will also be hereinafter referred to as an ID management type information processing system. The configuration of the ID management type information processing system is a configuration for executing payment processing between the card 10 and the reader/writer 20 in an online environment.

Furthermore, the card 10 of the ID management type information processing system will also be hereinafter referred to as an ID management type card 10. Furthermore, the reader/writer 20 of the ID management type information processing system will also be hereinafter referred to as an ID management type reader/writer 20.

Both of the value storage type information processing system that can be used in an offline state and the ID management type information processing system that can be used in an online state have been currently in widespread use. A case where the value storage type information processing system is migrated to the ID management type information processing system is assumed. At this time, during the migration, a state in which the value storage type card 10 and the value storage type reader/writer 20, and the ID management type card 10 and the ID management type reader/writer 20 mixedly exist is assumed. However, the card 10 and the reader/writer 20 that have been described above operate only in a combination of the card 10 and the reader/writer 20 of the same system. For example, even if the value storage type card 10 is moved into a communication range of the ID management type reader/writer 20, the both devices do not operate. Therefore, in the state in which the value storage type card 10 and the value storage type reader/writer 20, and the ID management type card 10 and the ID management type reader/writer 20 mixedly exist, there is a possibility that a user cannot use a service. Furthermore, because the arrangement of an online environment is also required during the migration, there is a possibility that the ID management type information processing system that is premised on online usage cannot be temporarily used during the arrangement of the online environment.

In view of the foregoing, as illustrated in FIG. 2, when migration is performed, an intermediate-state information processing system including functions of both the value storage type information processing system and the ID management type information processing system is prepared. Therefore, even in a state in which the value storage type card 10, the value storage type reader/writer 20, and the ID management type card 10 mixedly exist, by using an intermediate-state card 10 and an intermediate-state reader/writer 20, payment processing of the both systems can be executed.

An information processing system illustrated at the bottom of FIG. 2 includes the card 10, the reader/writer 20, and the first server 30 similarly to the ID management type information processing system. The card 10 of the information processing system includes the payment service information 104 same as that of the value storage type information processing system, an ID management type information processing system ID 102, and payment information 106. The payment information 106 is setting information indicating the setting of a service that corresponds to the payment service information 104.

Furthermore, the reader/writer 20 includes the card value payment function 204 same as that of the value storage type information processing system, the ID check function 206 same as that of the ID management type information processing system, and a synchronization function 202. The synchronization function 202 is a function for achieving harmonization between the payment service information 104 of the card 10 and the payment service information 304 of the first server 30.

Furthermore, the first server 30 includes the ID-based payment function 302 and the payment service information 304 that are the same as those of the ID management type information processing system.

The information processing system including the above-described components will also be hereinafter referred to as a hybrid-type information processing system. As described above, the configuration of the hybrid-type information processing system includes the components of the value storage type information processing system and the components of the ID management type information processing system. Therefore, in the hybrid-type information processing system, both of payment processing in an offline environment and payment processing in an online environment can be executed.

Furthermore, the card 10 of the hybrid-type information processing system will also be hereinafter referred to as a hybrid-type card 10. Furthermore, the reader/writer 20 of the hybrid-type information processing system will also be hereinafter referred to as a hybrid-type reader/writer 20.

Then, at a timing at which preparation for switching to the system is made, the functions of the hybrid-type card 10 and the hybrid-type reader/writer 20 are switched to the functions of the ID management type card 10 and the ID management type reader/writer 20. At this time, for example, by making a part of information of the hybrid-type card 10 unusable, a function of executing processing using the information is invalidated.

As described above, by switching from the value storage type information processing system to the ID management type information processing system via the hybrid-type information processing system, the migration can be smoothly performed.

Heretofore, the information processing system according to the present embodiment has been described with reference to FIGS. 1 and 2. Subsequently, the card 10 according to the present embodiment will be described.

2. Card According to Present Embodiment

Hereinafter, the card 10 according to the present embodiment will be described with reference to FIGS. 3 to 7. The card 10 according to the present embodiment is an information processing device (first information processing device) that performs transmission and reception of information with the reader/writer 20 by communication, and performs processing on the basis of the information.

2.1. Functional Configuration Example

Figure 3:
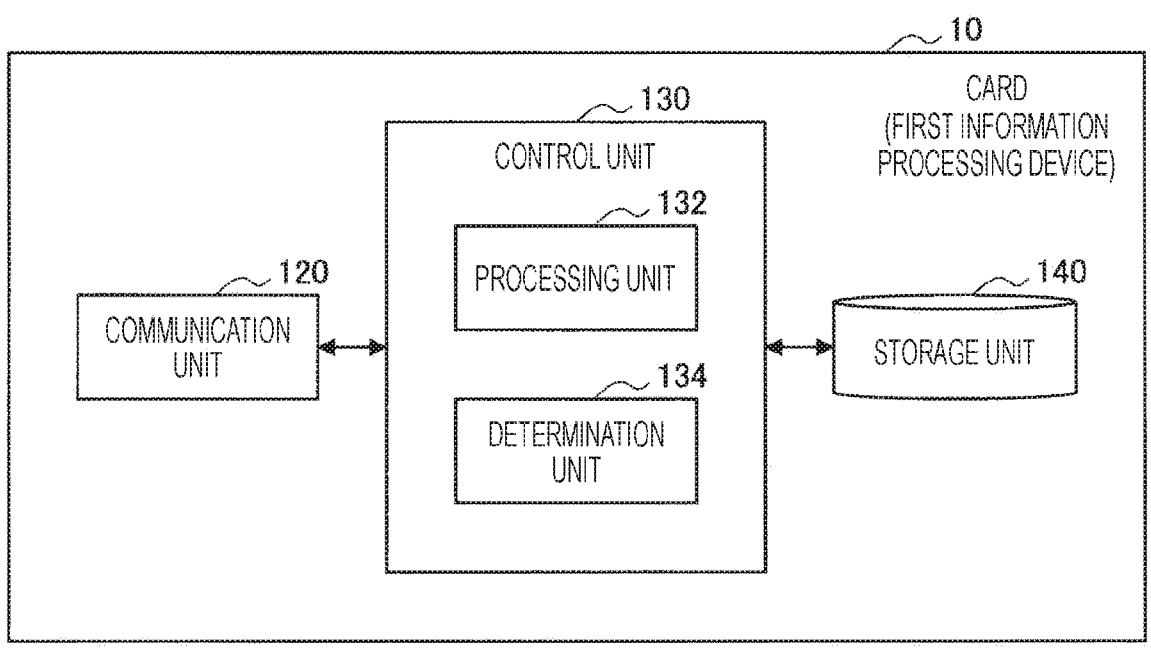
FIG. 3 is a block diagram illustrating a functional configuration example of a card according to the embodiment.

Hereinafter, a functional configuration example of the card 10 according to the present embodiment will be described with reference to FIGS. 3 to 6. FIG. 3 is a block diagram illustrating a functional configuration example of the card 10 according to the present embodiment. The card 10 includes a communication unit 120, a control unit 130, and a storage unit 140, for example.

(1) Communication Unit 120

The communication unit 120 performs communication with an external device. For example, the communication unit 120 performs communication with the reader/writer 20 by NFC. In the communication with the reader/writer 20, the communication unit 120 outputs information received from the reader/writer 20, to the control unit 130. Furthermore, in the communication with the reader/writer 20, the communication unit 120 transmits information input from the control unit 130, to the reader/writer 20. Note that, as described above, the communication unit 120 may be a communication device supporting a communication method other than the NFC, such as wireless communication that uses IEEE802.15.1, for example.

(2) Control Unit 130

The control unit 130 includes a function of controlling the entire card 10. For example, on the basis of information input from the communication unit 120, the control unit 130 determines processing to be executed, and executes the processing. For implementing the function, the control unit 130 includes a processing unit 132 and a determination unit 134, for example.

(Processing Unit 132)

The processing unit 132 includes a function of executing processing determined on the basis of a request from an external device. As a function including the processing, for example, the processing unit 132 includes a first function of executing processing that uses service information stored in a recording medium. Specifically, the processing unit 132 includes a function (first function) of executing processing of transmitting the payment service information 104 (service information) stored in the storage unit 140 (recording medium), to the reader/writer 20 (external device).

Furthermore, the processing unit 132 includes a second function of executing processing that uses identification information regarding a service that is stored in a recording medium. Specifically, the processing unit 132 includes a function (second function) of executing processing of transmitting the ID 102 (identification information) stored in the storage unit 140 (recording medium), to the reader/writer 20 (external device).

Figure 4:
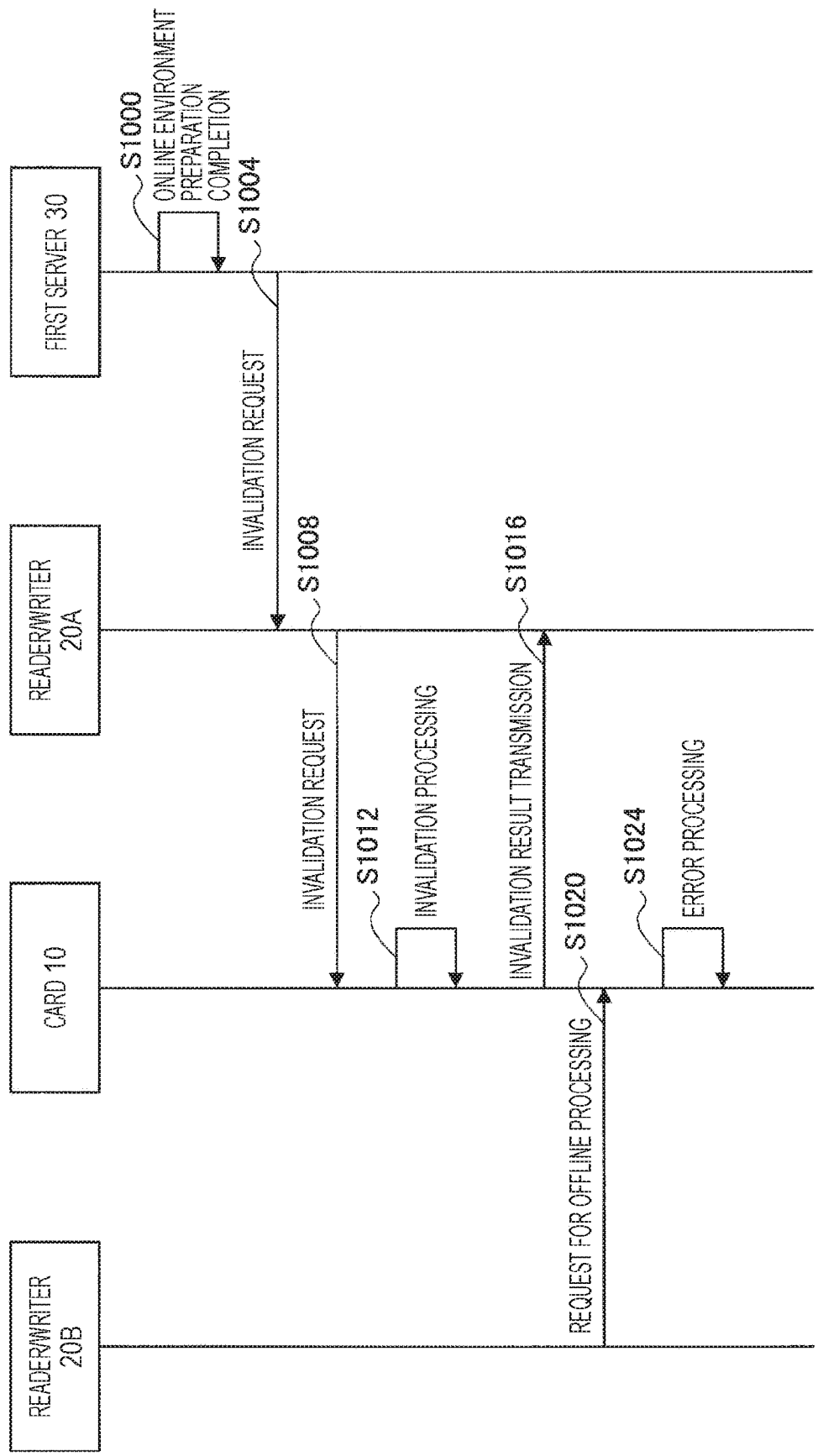
FIG. 4 is a sequence diagram illustrating an example of invalidation processing of a first function of the card according to the embodiment.

Furthermore, the processing unit 132 includes a function of invalidating the first function on the basis of an invalidation request from an external device. Here, the invalidation request refers to an instruction for invalidating the first function. For example, the invalidation request is transmitted from the first server 30 to the card 10 via the reader/writer 20 when preparation for an online environment in the ID management type information processing system is made. The processing unit 132 that has received the invalidation request invalidates the first function on the basis of the payment information 106 (setting information) including the setting related to processing that uses the payment service information 104, for example. More specifically, invalidation processing of the first function of the card 10 will be described in detail with reference to FIG. 4. FIG. 4 is a sequence diagram illustrating an example of invalidation processing of a first function of the card 10 according to the present embodiment.

As illustrated in FIG. 4, when preparation for an online environment is completed (Step S1000), the first server 30 transmits an invalidation request of the first function to the card 10 via a reader/writer 20A (Step S1004, Step S1008). When the card 10 receives the invalidation request, the processing unit 132 of the card 10 invalidates the first function by changing the payment information 106 on the basis of the invalidation request (Step S1012). Then, the card 10 transmits a result of the invalidation processing to the reader/writer 20A (Step S1016), and ends the invalidation processing of the first function.

Note that, in a case where the card 10 receives a request for offline processing from a reader/writer 20B after the invalidation of the first function (Step S1020), the processing unit 132 executes error processing (Step S1024). For example, as the error processing, the processing unit 132 notifies the reader/writer 20B that the offline processing cannot be executed. Furthermore, as the error processing, the processing unit 132 may return no response to the request from the reader/writer 20B.

Here, information included in the payment information 106 will be described. As described above, the payment information 106 is setting information related to processing that uses the payment service information 104. The payment information 106 includes data indicating various settings such as an offline payment function flag, a maximum amount limit of offline payment, and offline payment value default value, for example.

The offline payment function flag is a flag indicating whether or not the first function is invalidated. For example, in a case where the flag is activated, the first function is not invalidated. Furthermore, in a case where the flag is deactivated, the first function is invalidated. Note that the setting of the offline payment function flag is changed by the processing unit 132 on the basis of an instruction received from an external device. For example, when an instruction for invalidating the first function is received from the reader/writer 20, the flag is changed by the processing unit 132 from the activated state to the deactivated state. Note that, when preparation for an online environment is made on the first server 30 side, the reader/writer 20 receives an instruction for invalidating the first function of the card 10, from the first server 30.

Furthermore, the maximum amount limit of offline payment is an amount limit of a money amount that can be used by the user in offline payment processing. Furthermore, the offline payment value default value is updated in online payment, and a value not exceeding the maximum amount limit is set. At the same time, a value in the payment service information 104 is set to the same value as the offline payment value default value, but the value is updated in offline payment. Therefore, after the setting of the offline payment value default value, the processing unit 132 can compare the value in the payment service information 104 and the offline payment value default value, and determine whether or not payment processing has been executed in an offline state, on the basis of whether or not there is a difference.

As described above, the processing unit 132 determines whether or not the first function is to be invalidated, on the basis of the offline payment function flag. Note that, in a case where the first function is not invalidated, the processing unit 132 executes processing that uses service information, on the basis of setting information. For example, when the processing unit 132 receives a writing request from the reader/writer 20, the processing unit 132 executes writing processing of the payment service information 104 and the payment information 106 on the basis of the payment information 106 being setting information.

(Determination Unit 134)

The determination unit 134 includes a function of determining processing to be executed by the processing unit 132, on the basis of a request from an external device. For example, the determination unit 134 determines processing to be executed by the processing unit 132, on the basis of a request for acquisition of the payment service information 104 or an acquisition request for the ID 102 that has been received from the reader/writer 20 (external device).

For example, in a case where a request for acquisition of the payment service information 104 has been received from the reader/writer 20, the determination unit 134 determines that the processing unit 132 is to execute the function (first function) of executing processing of transmitting the payment service information 104 to the reader/writer 20.

Furthermore, in a case where a request for acquisition of the ID 102 has been received from the reader/writer 20, the determination unit 134 determines that the processing unit 132 is to execute the function (second function) of executing processing of transmitting the ID 102 to the reader/writer 20.

Furthermore, in a case where a request for acquisition of the payment service information 104 and a request for acquisition of the ID 102 have been both received from the reader/writer 20, the determination unit 134 determines that the processing unit 132 is to execute both of the first function and the second function.

(3) Storage Unit 140

The storage unit 140 is a device for storing information regarding the card 10. For example, the storage unit 140 stores data output in processing of the control unit 130, and data of various applications and the like. Specifically, the storage unit 140 stores data to be used in the above-described first function and second function.

Figure 5:
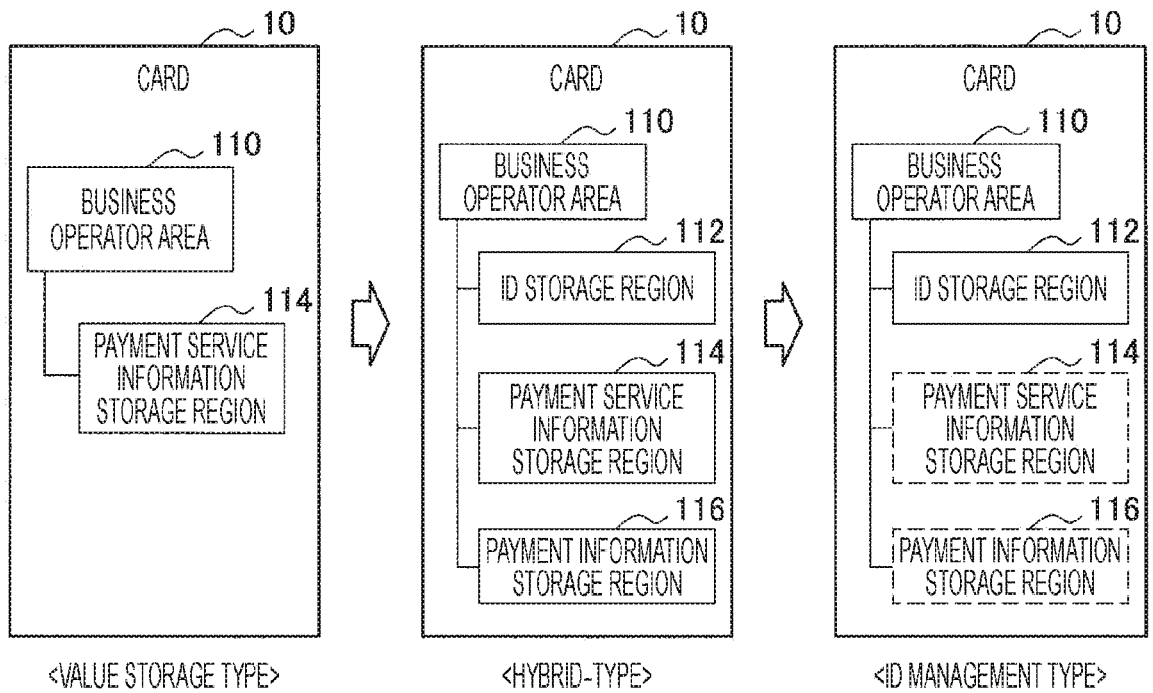
FIG. 5 is an explanatory diagram illustrating a data region example of a storage unit of the card according to the embodiment.
Figure 6:
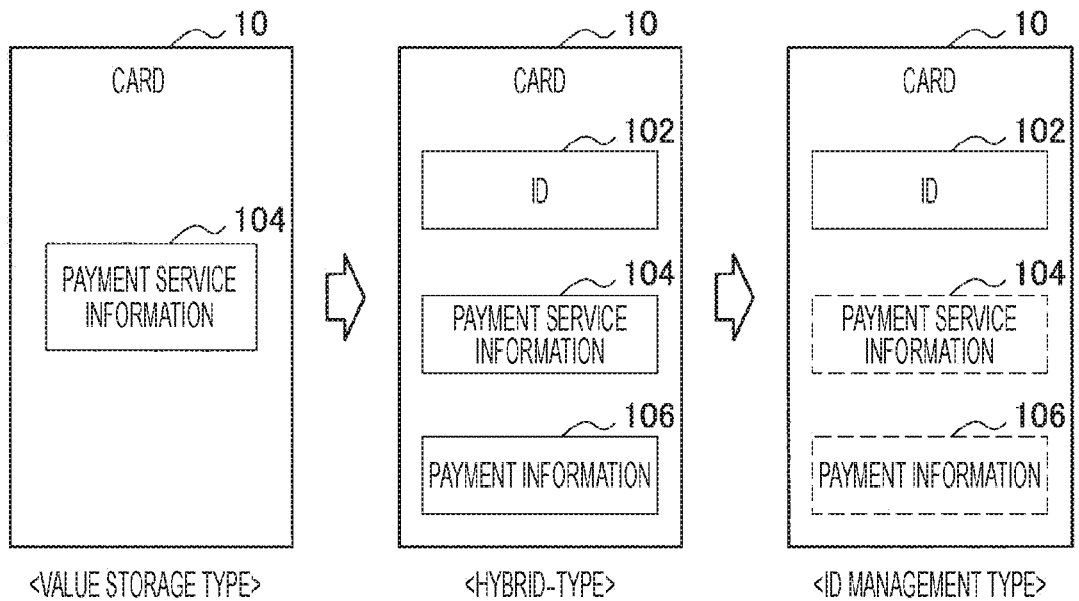
FIG. 6 is an explanatory diagram illustrating a data example stored in the storage unit of the card according to the embodiment.

Here, a configuration example of data in the storage unit 140 according to the present embodiment will be described with reference to FIGS. 5 and 6. FIG. 5 is an explanatory diagram illustrating a data region example of the storage unit of the card 10 according to the present embodiment. FIG. 6 is an explanatory diagram illustrating a data example stored in the storage unit of the card 10 according to the present embodiment.

The storage unit 140 of the card 10 according to the present embodiment is provided with a region for storing information for every business operator that provides a service, and the region will be referred to as a business operator area 110. Information regarding a service provided by a business operator is stored in the business operator area 110. Note that, in the example illustrated in FIG. 5, only one business operator area 110 is illustrated in the card 10, but the number of business operator areas 110 is not limited, and a plurality of business operator areas 110 may be provided.

As illustrated in FIG. 5, the value storage type card 10 includes a payment service information storage region 114. In the payment service information storage region 114, the payment service information 104 for offline payment that is included in the value storage type card 10 illustrated in FIG. 6 is stored.

Furthermore, as illustrated in FIG. 5, the hybrid-type card 10 includes an ID storage region 112, the payment service information storage region 114, and a payment information storage region 116. In the above-described respective regions, the ID 102 for online payment, the payment service information 104 for offline payment, and the payment information 106 for synchronization between offline payment and online payment that are included in the hybrid-type card 10 illustrated in FIG. 6 are respectively stored.

Furthermore, as illustrated in FIG. 5, similarly to the hybrid-type card 10, the ID management type card 10 includes the ID storage region 112, the payment service information storage region 114, and the payment information storage region 116. Nevertheless, in the ID management type information processing system, in accordance with the invalidation of the first function, the payment service information storage region 114 and the payment information storage region 116 that are included in the card 10 are in an unusable state. Therefore, in the ID management type card 10, only the ID 102 for online payment that is included in the ID management type card 10 illustrated in FIG. 6 is stored in the ID storage region 112.

Note that, as the ID management type card 10, the card 10 only including the ID storage region 112 may be used.

Furthermore, the card 10 can be provided with a plurality of business operator areas 110, and information regarding services provided by the respective business operators is stored in the plurality of respective business operator areas 110. Therefore, the storage unit 140 can include, for each of the services provided by the respective business operators, the ID 102 (identification information), the payment service information 104 (service information), and the payment information 106 (setting information). As described above, because the payment information 106 exists for each service, by changing the payment information 106 of a service corresponding to an invalidation request from an external device, the processing unit 132 can invalidate the first function for every service.

Heretofore, a functional configuration example of the card 10 according to the present embodiment has been described with reference to FIGS. 3 to 6. Subsequently, a hardware configuration example of the card 10 according to the present embodiment will be described.

2.2. Hardware Configuration Example

Figure 7:
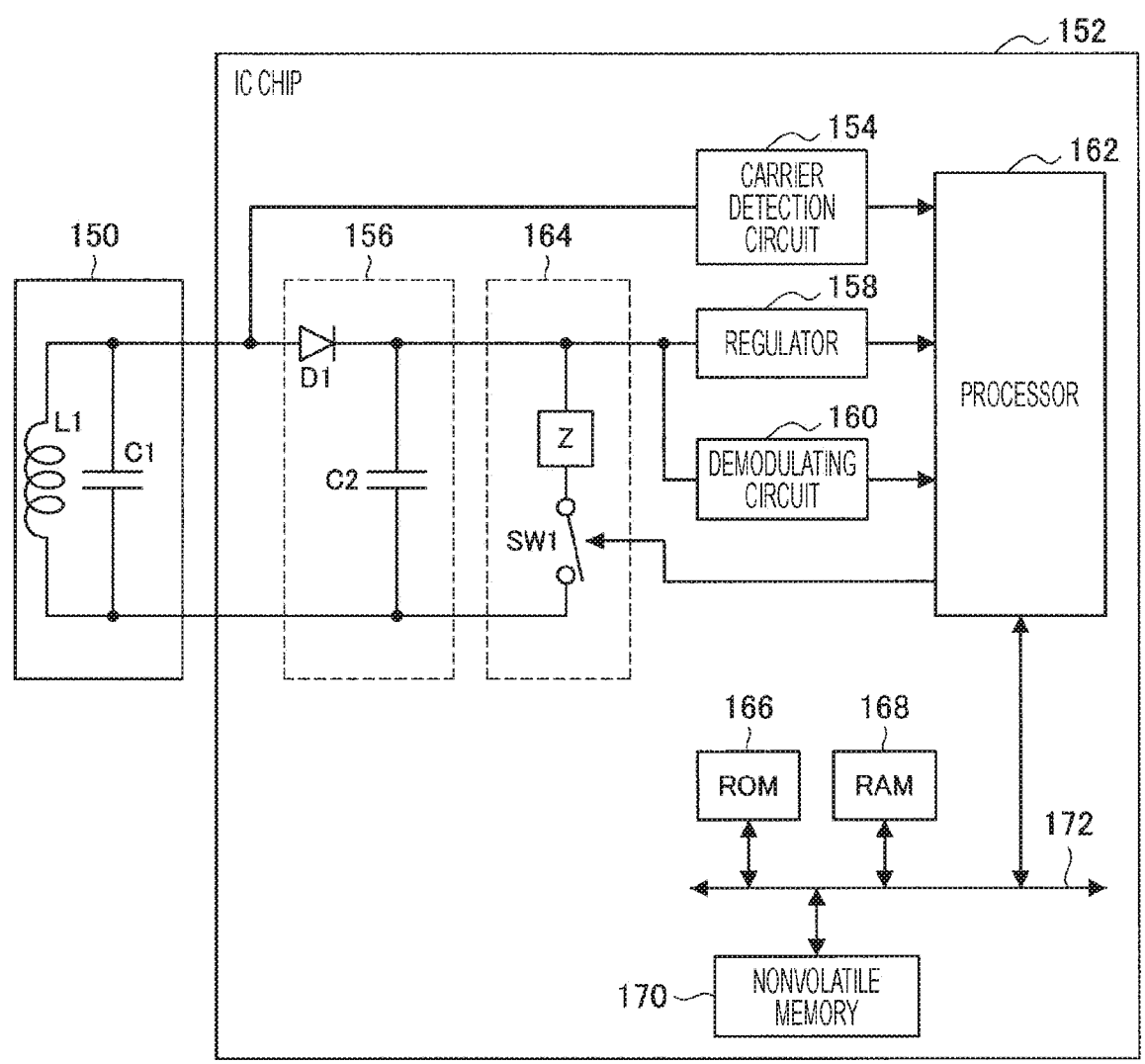
FIG. 7 is a block diagram illustrating a hardware configuration example of the card according to the embodiment.

Hereinafter, a hardware configuration example of the card 10 according to the present embodiment will be described with reference to FIG. 7. FIG. 7 is a block diagram illustrating a hardware configuration example of the card 10 according to the present embodiment. The card 10 includes an antenna 150 and an IC chip 152, for example. Note that the card 10 needs not include the configuration of the IC chip 152 illustrated in FIG. 7, for example, in the form of an IC chip.

The card 10 having the hardware configuration illustrated in FIG. 7 is driven by a received voltage corresponding to a carrier wave received by the antenna 150. Note that the card 10 can also be driven by power supplied from an internal power source such as a battery that is included in the card 10, power supplied from a connected external power source, or the like, for example.

(1) Antenna 150

The antenna 150 includes a resonance circuit including, for example, a coil (inductor) L1 having a predetermined inductance, and a capacitor C1 having a predetermined electrostatic capacitance, and generates an inductive voltage by electromagnetic induction in accordance with the reception of a carrier wave. Then, the antenna 150 outputs a received voltage obtained by resonating the inductive voltage with a predetermined resonance frequency. Here, the resonance frequency in the antenna 150 is set to 13.56 MHz or the like, for example, in accordance with the frequency of the carrier wave. With the above-described configuration, the antenna 150 receives a carrier wave and further transmits a reply signal by load modulation performed in a load modulation circuit 164 included in the IC chip 152.

(2) IC Chip 152

The IC chip 152 includes, for example, a carrier detection circuit 154, a detector circuit 156, a regulator 158, a demodulating circuit 160, a processor 162, and the load modulation circuit 164. Note that the IC chip 152 may further include, for example, a protection circuit (not illustrated) for preventing an excess voltage or an excess current from being applied to the processor 162, which is not illustrated in FIG. 7. Here, examples of the protection circuit (not illustrated) include a clamp circuit including a diode and the like.

Furthermore, the IC chip 152 includes, for example, a read only memory (ROM) 166, a random access memory (RAM) 168, and a nonvolatile memory 170. The processor 162, the ROM 166, the RAM 168, and the nonvolatile memory 170 are connected by a bus 172 serving as a transmission path of data, for example.

(ROM 166)

The ROM 166 stores programs to be used by the processor 162 and control data such as calculation parameters.

(RAM 168)

The RAM 168 temporarily stores programs to be executed by the processor 162, a calculation result, an execution state, and the like.

(Nonvolatile Memory 170)

The nonvolatile memory 170 stores various types of data such as data related to information processing according to the present embodiment such as service information and setting information, data corresponding to various services, and various application programs, for example. A key according to the present embodiment is, for example, data to be used for confirmation of digital signature, authentication (including authentication for accessing a region in a recording medium) in communication of an arbitrary communication method such as NFC, arbitrary encryption, processing related to decryption, and the like.

Here, examples of the nonvolatile memory 170 include an electrically erasable and programmable read only memory (EEPROM), a flash memory, and the like.

Furthermore, the nonvolatile memory 170 has tamper resistance, for example. By data being stored in a secure recording medium having tamper resistance such as the nonvolatile memory 170, the security of data is assured in the card 10.

(Carrier Detection Circuit 154)

The carrier detection circuit 154 generates a rectangular detection signal on the basis of a received voltage transmitted from the antenna 150, for example, and transmits the detection signal to the processor 162. Furthermore, the processor 162 uses the above-described transmitted detection signal as a processing clock for data processing, for example. Here, because the above-described detection signal is based on the received voltage transmitted from the antenna 150, the above-described detection signal is synchronized with the frequency of a carrier wave transmitted from an external device such as the reader/writer 20. Accordingly, by including the carrier detection circuit 154, the IC chip 152 can perform processing with an external device such as the reader/writer 20, in synchronization with the external device.

(Detector Circuit 156)

The detector circuit 156 rectifies a received voltage output from the antenna 150. Here, the detector circuit 156 includes a diode D1 and a capacitor C2, for example.

(Regulator 158)

The regulator 158 smooths a received voltage to be a constant voltage, and outputs a drive voltage to the processor 162. Here, the regulator 158 uses a direct-current component of the received voltage as a drive voltage. Note that, as described above, for example, in a case where the card 10 includes an internal power source such as a battery, or in a case where an external power source is connected to the card 10, the card 10 can also be driven by power supplied from the internal power source or power supplied from the external power source.

(Demodulating Circuit 160)

The demodulating circuit 160 demodulates a carrier signal included in a carrier wave, on the basis of a received voltage, and outputs data corresponding to the carrier signal (e.g., data signal binarized to high level and low level). Here, the demodulating circuit 160 outputs an alternating-current component of the received voltage as data.

(Processor 162)

The processor 162 is driven using a drive voltage output from the regulator 158, for example, as power, and performs processing of data demodulated in the demodulating circuit 160.

Furthermore, the processor 162 selectively generates a control signal for controlling load modulation related to a reply to an external device such as the reader/writer 20, in accordance with a processing result. Then, the processor 162 selectively outputs the control signal to the load modulation circuit 164.

Note that the processing in the processor 162 is not limited to processing of data demodulated in the demodulating circuit 160. For example, the processor 162 can perform processing of arbitrary data.

The processor 162 includes, for example, one or two or more processors including an arithmetic circuit such as a micro processing unit (MPU), various processing circuits, and the like.

(Load Modulation Circuit 164)

The load modulation circuit 164 includes, for example, a load Z and a switch SW1, and performs load modulation by selectively connecting (activating) the load Z in accordance with the control signal transmitted from the processor 162. Here, the load Z includes, for example, a resistor having a predetermined resistance value. Furthermore, the switch SW1 includes, for example, a p-channel metal oxide semiconductor field effect transistor (MOSFET), or an n-channel MOSFET.

With the above-described configuration, for example, the IC chip 152 can process a carrier signal received by the antenna 150, and transmit a reply signal to the antenna 150 by load modulation. Furthermore, with the above-described configuration, for example, the IC chip 152 can perform processing of arbitrary data.

Note that a hardware configuration of the information processing device (first information processing device) according to the present embodiment is not limited to the configuration illustrated in FIG. 7.

Heretofore, a hardware configuration example of the card 10 according to the present embodiment has been described with reference to FIG. 7.

Heretofore, the card 10 according to the present embodiment has been described with reference to FIGS. 3 to 7. Subsequently, the reader/writer 20 according to the present embodiment will be described.

3. Reader/Writer According to Present Embodiment

Hereinafter, the reader/writer 20 according to the present embodiment will be described with reference to FIGS. 8 to 10. The reader/writer 20 according to the present embodiment is an information processing device (second information processing device) that performs transmission and reception of information with the card 10 by communication, and performs processing on the basis of the information.

3.1. Functional Configuration Example

Hereinafter, a functional configuration example of the reader/writer 20 according to the present embodiment will be described with reference to FIGS. 8 and 9. FIG. 8 is a block diagram illustrating a functional configuration example of the reader/writer 20 according to the present embodiment. The reader/writer 20 includes, for example, a communication unit 220, a control unit 230, and a storage unit 240.

(1) Communication Unit 220

The communication unit 220 performs communication with an external device. For example, the communication unit 220 performs communication with the card 10 by NFC. In the communication with the card 10, the communication unit 220 outputs information received from the card 10, to the control unit 230. Furthermore, in the communication with the card 10, the communication unit 220 transmits information input from the control unit 230, to the card 10. Note that, as described above, the communication unit 220 may be a communication device supporting a communication method other than the NFC, such as wireless communication that uses IEEE802.15.1, for example.

(2) Control Unit 230

The control unit 230 includes a function of controlling the entire reader/writer 20. For example, on the basis of information input from the communication unit 220, the control unit 230 determines processing to be executed, and executes the processing. For implementing the function, the control unit 230 includes a processing unit 232 and a determination unit 234, for example.

(Processing Unit 232)

The processing unit 232 includes a function of executing processing determined on the basis of acquired information. As the function, for example, the processing unit 232 includes a first function of executing processing that uses service information stored in a communication target external device. Specifically, the processing unit 232 includes a function (first function) of executing offline payment processing using the payment service information 104 (service information) acquired from the card 10 (external device). By the offline payment processing, the processing unit 232 can execute payment processing using the card value payment function 204, for example.

Furthermore, the processing unit 232 includes a second function of executing processing that uses identification information regarding a service stored in the external device. Specifically, the processing unit 232 includes a function (second function) of executing online payment processing using the ID 102 (identification information) acquired from the card (external device). By the online payment processing, the processing unit 232 can execute ID acquisition processing using the ID check function 206, for example.

Furthermore, the processing unit 232 includes a function of performing synchronization processing of achieving harmonization between offline side payment information and online side payment information. Specifically, in a case where the processing unit 232 is determined to execute both of the above-described offline payment processing and online payment processing, and an online environment is in a usable state, the processing unit 232 executes the synchronization processing using the synchronization function 202. The details of the synchronization processing will be described later.

(Determination Unit 234)

The determination unit 234 includes a function of determining processing to be executed by the processing unit 232, on the basis of acquired information. For example, the determination unit 234 determines processing to be executed by the processing unit 232, on the basis of at least one of service information or identification information that has been acquired from the card 10 (external device). Furthermore, the determination unit 234 determines processing to be executed by the processing unit 232, on the basis of information regarding an online environment that has been acquired from the first server 30 (external device). The detailed processing for the determination unit 234 determining processing to be executed by the processing unit 232 will be described later.

(3) Storage Unit 240

The storage unit 240 is a device for storing information regarding the reader/writer 20. For example, the storage unit 240 stores data to be output in the processing of the control unit 230, and data of various applications and the like. Specifically, the storage unit 240 stores data of an application related to the above-described function.

Here, an example of data stored in the storage unit 240 of the reader/writer 20 will be described with reference to FIG. 9. FIG. 9 is an explanatory diagram illustrating an example of data stored in the storage unit 240 of the reader/writer 20 according to the present embodiment.

Figure 9:
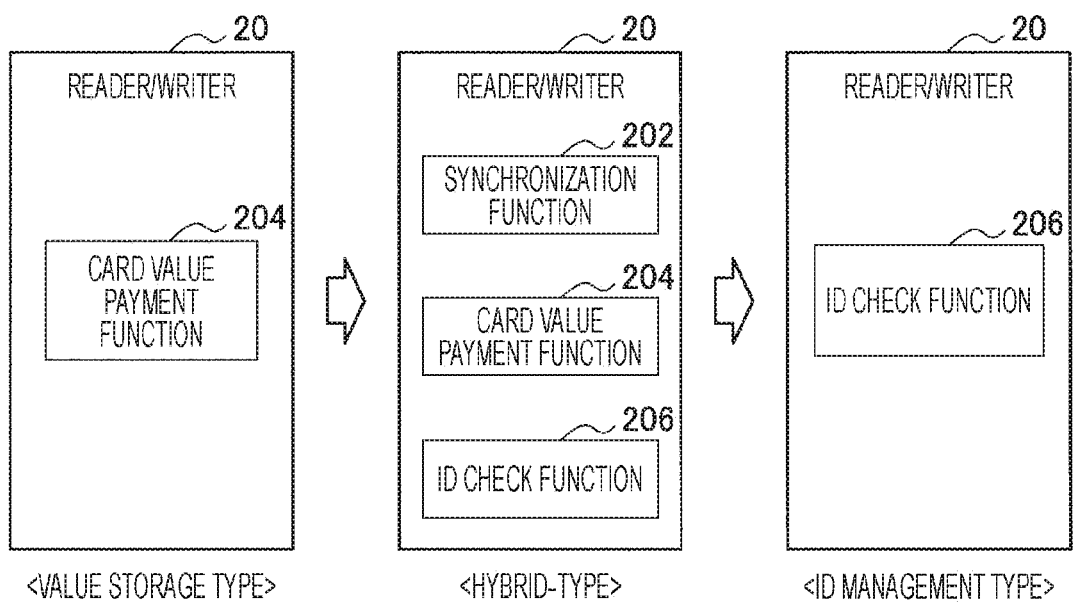
FIG. 9 is an explanatory diagram illustrating a data example stored in a storage unit of the reader/writer according to the embodiment.

As illustrated in FIG. 9, in the case of the value storage type reader/writer 20, the storage unit 240 stores data of an application related to the card value payment function 204.

By the storage unit 240 storing the data, the value storage type reader/writer 20 can execute offline payment processing.

Furthermore, in a case where the reader/writer 20 is switched to the hybrid-type reader/writer 20 by migration, the storage unit 240 stores data of an application related to the synchronization function 202, the card value payment function 204, and the ID check function 206. By the storage unit 240 storing data of an application related to the synchronization function 202, the hybrid-type reader/writer 20 can execute online payment processing with synchronization that supports the hybrid-type card 10. By the storage unit 240 storing data of an application related to the card value payment function 204, the hybrid-type reader/writer 20 can execute offline payment processing that supports the value storage type card 10. By the storage unit 240 storing data of an application related to the ID check function 206, the hybrid-type reader/writer 20 can execute online payment processing that supports the ID management type card 10.

Furthermore, in a case where the reader/writer 20 is further switched to the ID management type reader/writer 20, the storage unit 240 stores data of an application related to the ID check function 206. By the storage unit 240 storing the data, the ID management type reader/writer 20 can execute online payment processing that supports the ID management type card 10.

Figure 8:
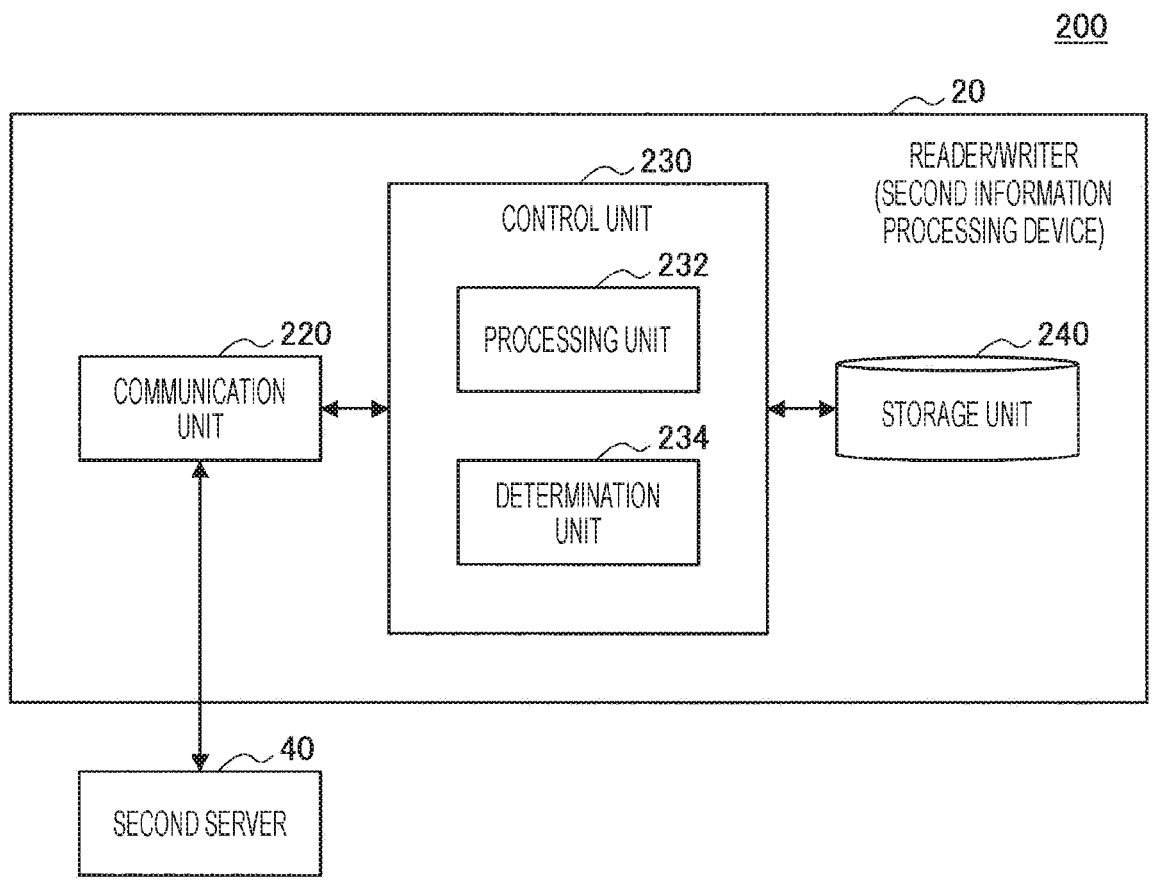
FIG. 8 is a block diagram illustrating a functional configuration example of a reader/writer according to the embodiment.

Note that the configuration of the reader/writer 20 according to the present embodiment is typically the configuration illustrated in FIG. 8, but the reader/writer 20 may be a reader/writer 200 having a configuration including a second server 40 in addition to the configuration. In this case, the second server 40 of the reader/writer 200 may include the function of the control unit 230 in the reader/writer 20.

Heretofore, a functional configuration example of the reader/writer 20 according to the present embodiment has been described with reference to FIGS. 8 and 9. Subsequently, a hardware configuration example of the reader/writer 20 according to the present embodiment will be described.

3.2. Hardware Configuration Example

Hereinafter, a hardware configuration example of the reader/writer 20 according to the present embodiment will be described with reference to FIG. 10. FIG. 10 is a block diagram illustrating a hardware configuration example of the reader/writer 20 according to the present embodiment The reader/writer 20 includes, for example, an MPU 250, a ROM 252, a RAM 254, a recording medium 256, a communication interface 258, a carrier wave transmission circuit 260, and an antenna 262. Furthermore, the reader/writer 20 connects between the components by a bus 264 serving as a transmission path of data, for example. Furthermore, the reader/writer 20 can also be driven by power supplied from an internal power source such as a battery that is included in the reader/writer 20, power supplied from a connected external power source, or the like, for example.

(1) MPU 250

The MPU 250 includes, for example, one or two or more processors including an arithmetic circuit such as an MPU, various processing circuits, and the like, and functions as a control unit (not illustrated) that controls the entire reader/writer 20.

(2) ROM 252

The ROM 252 stores programs to be used by the MPU 250, control data such as calculation parameters, and the like.

(3) RAM 254

The RAM 254 temporarily stores programs to be executed by the MPU 250, and the like, for example.

(4) Recording Medium 256

The recording medium 256 functions as a storage unit (not illustrated), and stores various types of data of various applications and the like, for example. Here, examples of the recording medium 256 include a magnetic recording medium such as a hard disk and a nonvolatile memory such as a flash memory, for example. Furthermore, the recording medium 256 may be detachable from the reader/writer 20.

(5) Communication Interface 258

The communication interface 258 serves as a communication means that performs communication of one communication method included in the reader/writer 20, and functions as a first communication unit (not illustrated) for performing wireless or wired communication with an external device such as a server via a network (or directly). Here, for example, the communication interface 258 corresponds to a communication antenna and an RF circuit (wireless communication), an IEEE802.15.1 port and a transmission and reception circuit (wireless communication), an IEEE802.11 port and a transmission and reception circuit (wireless communication), a LAN terminal and a transmission reception circuit (wired communication), or the like. Furthermore, the communication interface 258 may have an arbitrary configuration corresponding to a network according to the present embodiment.

The carrier wave transmission circuit 260 and the antenna 262 serve as a communication means that performs communication of another communication method included in the reader/writer 20, and function as a second communication unit (not illustrated) for performing wireless or wired communication with an external device such as the card 10.

(6) Antenna 262

The antenna 262 includes, for example, a resonance circuit including a coil serving as a transmission and reception antenna and having a predetermined inductance, and a capacitor having a predetermined electrostatic capacitance, and a demodulating circuit. Then, by receiving a carrier wave with a predetermined frequency such as 13.56 MHz, for example, the antenna 262 demodulates, for example, data transmitted from an external device such as the card 10 by load modulation and the like. Note that, in a case where the carrier wave transmission circuit 260 includes a demodulating circuit, for example, the antenna 262 may include a resonance circuit.

(7) Carrier Wave Transmission Circuit 260

The carrier wave transmission circuit 260 includes, for example, a modulation circuit that performs modulation such as amplitude shift keying (ASK), and an amplification circuit that amplifies an output from the modulation circuit, and causes a carrier wave including a carrier signal to be transmitted from the transmission and reception antenna of the antenna 262. Furthermore, the carrier wave transmission circuit 260 may include a demodulating circuit that demodulates a signal received by the antenna 262, for example. The demodulating circuit demodulates a signal received by the antenna 262, by performing envelope detection of an amplitude change in voltage between the modulation circuit (or amplification circuit) and the resonance circuit of the antenna 262, and binarizing the detected signal, for example. Note that the demodulating circuit can also demodulate a signal received by the antenna 262, using a phase variation in voltage between the modulation circuit (or amplification circuit) and the resonance circuit of the antenna 262, for example.

By including the carrier wave transmission circuit 260, the reader/writer 20 includes an initiator function in NFC, and functions as a so-called a reader/writer. Here, examples of a carrier signal transmitted by the carrier wave transmission circuit 260 from the antenna 262 include various signals such as a polling signal and signals indicating various commands such as a writing command. Examples of the writing command according to the present embodiment include a writing command of data, and data indicating various parameters indicating a writing target region and the like. Furthermore, the writing command may include writing target data.

In the carrier wave transmission circuit 260, the transmission of a carrier wave is controlled by the MPU 250, for example.

Figure 10:
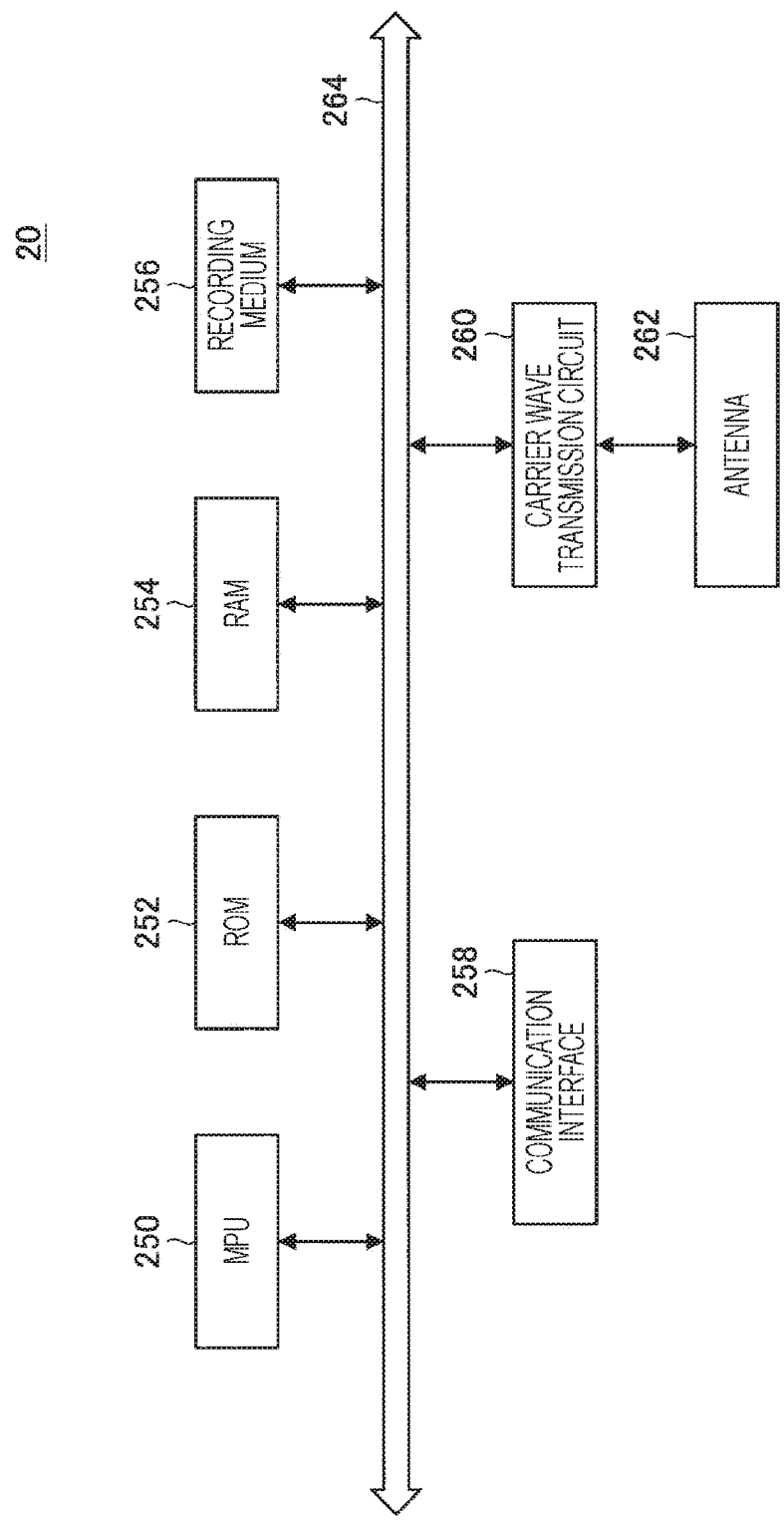
FIG. 10 is a block diagram illustrating a hardware configuration example of the reader/writer according to the embodiment.

The reader/writer 20 includes the hardware configuration illustrated in FIG. 10, for example. Note that a hardware configuration of the reader/writer 20 according to the present embodiment is not limited to the configuration illustrated in FIG. 10.

For example, in a case where the reader/writer 20 performs communication with an external device via an external communication device including a function similar to that of the communication interface 258, the reader/writer 20 needs not include the communication interface 258.

Furthermore, in a case where the reader/writer 20 performs communication with an external device via an external communication device including functions similar to those of the carrier wave transmission circuit 260 and the antenna 262, the reader/writer 20 needs not include the carrier wave transmission circuit 260 and the antenna 262.

Furthermore, in a case where the reader/writer 20 performs communication with an external device using a communication method other than NFC such as wireless communication that uses IEEE802.15.1, the reader/writer 20 needs not include the carrier wave transmission circuit 260 and the antenna 262. In the above-described case, by including a communication device supporting the communication method other than NFC, or by an external communication device supporting the communication method other than NFC, the reader/writer 20 performs communication with an external device.

Furthermore, the reader/writer 20 can have a configuration not including the recording medium 256, for example.

Furthermore, for example, the configuration illustrated in FIG. 10 may be implemented on one or two or more ICs.

Heretofore, a hardware configuration example of the reader/writer 20 according to the present embodiment has been described with reference to FIG. 10.

Heretofore, the reader/writer 20 according to the present embodiment has been described with reference to FIGS. 8 to 10. Subsequently, an operation example of the information processing system according to the present embodiment will be described.

4. Operation Example

Hereinafter, an operation example of the information processing system according to the present embodiment will be described with reference to FIGS. 11 to 14.

4.1. Offline Payment Processing

Figure 11:
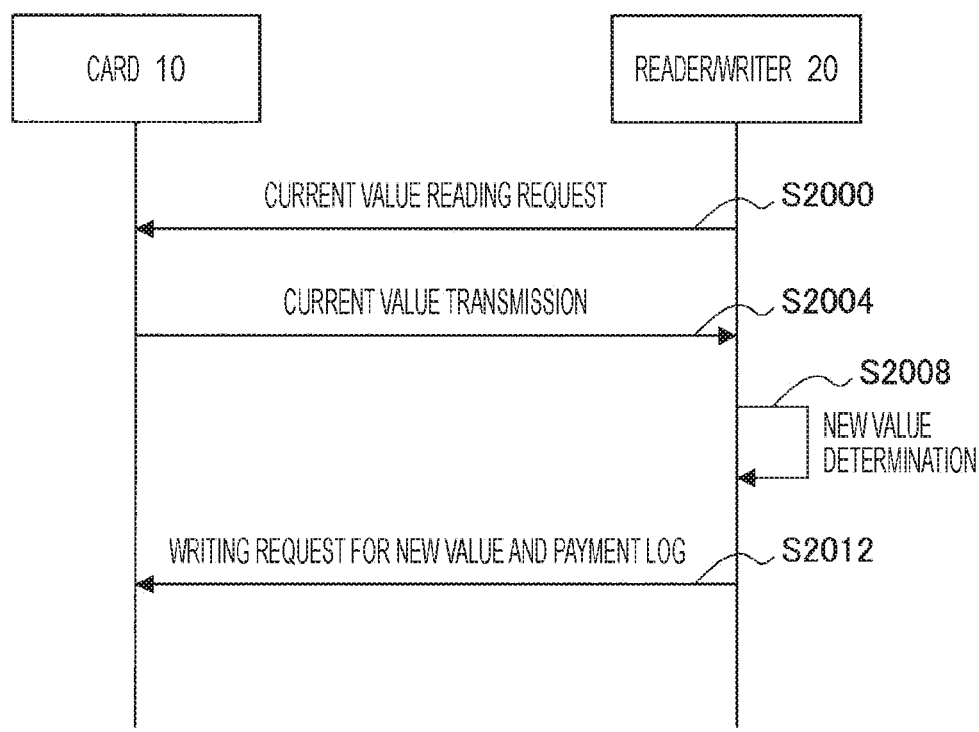
FIG. 11 is a sequence diagram illustrating an example of offline payment processing of the information processing system according to the embodiment.

Hereinafter, an example of offline payment processing of the information processing system according to the present embodiment will be described with reference to FIG. 11. FIG. 11 is a sequence diagram illustrating an example of offline payment processing of the information processing system according to the present embodiment. The offline payment processing can be applied to each of a combination of the value storage type card 10 and the value storage type reader/writer 20, a combination of the value storage type card 10 and the hybrid-type reader/writer 20, and a combination of the hybrid-type card 10 and the hybrid-type reader/writer 20.

In the offline payment processing, as illustrated in FIG. 11, first of all, any reader/writer 20 included in the above-described combinations requires a corresponding card 10 to read a currently-recorded value (Step S2000). The card 10 that has received a request from the reader/writer 20 transmits the current value to the reader/writer 20 (Step S2004). The reader/writer 20 that has received the current value from the card 10 determines a new value on the basis of the current value using the card value payment function 204 (Step S2008). Then, the reader/writer 20 requests the card 10 to write the determined new value and a payment log (Step S2012). Then, the information processing system ends the offline payment processing.

Heretofore, an example of offline payment processing of the information processing system according to the present embodiment has been described with reference to FIG. 11. Subsequently, an example of online payment processing of the information processing system according to the present embodiment will be described.

4.2. Online Payment Processing (Without Synchronization)

Figure 12:
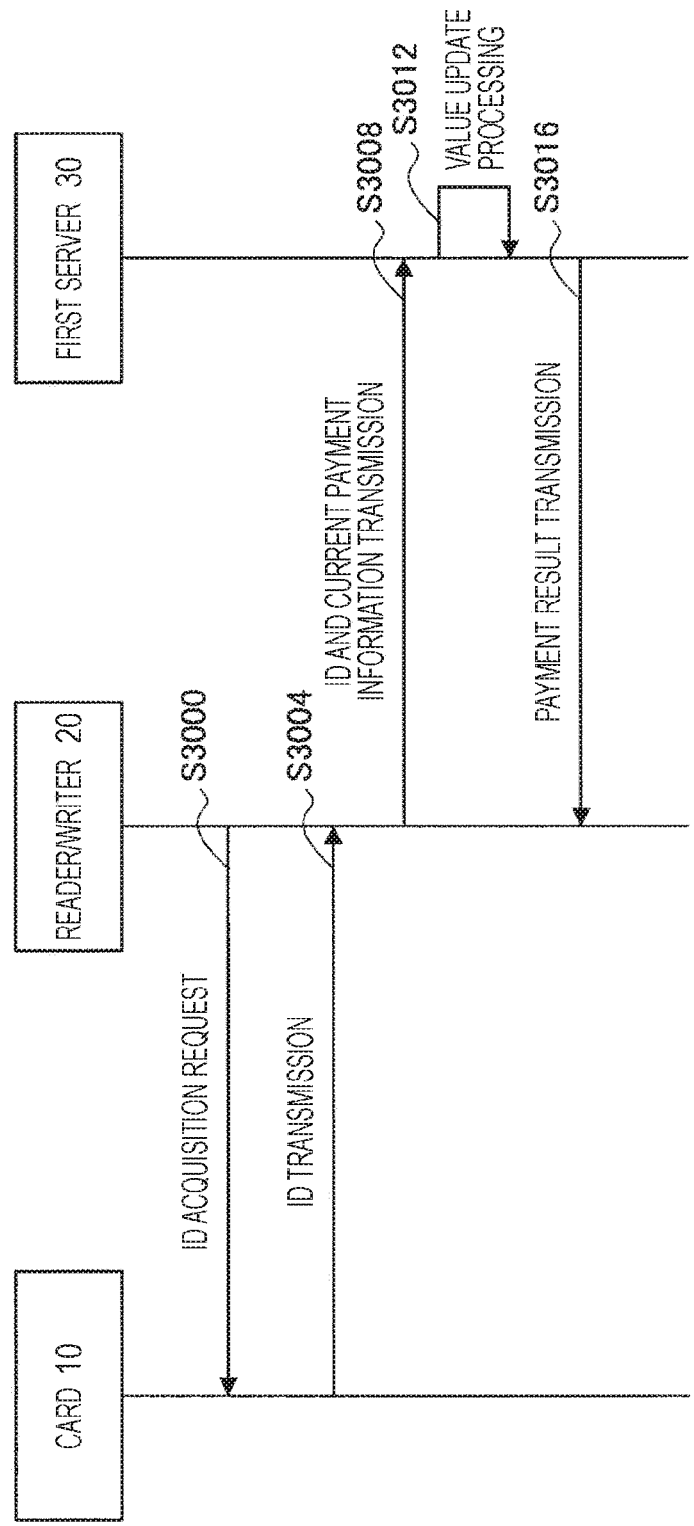
FIG. 12 is a sequence diagram illustrating an example of online payment processing (without synchronization) of the information processing system according to the embodiment.

Hereinafter, an example of online payment processing (without synchronization) of the information processing system according to the present embodiment will be described with reference to FIG. 12. FIG. 12 is a sequence diagram illustrating an example of online payment processing (without synchronization) of the information processing system according to the present embodiment. The online payment processing (without synchronization) can be applied to each of a combination of the ID management type card 10 and the hybrid-type reader/writer 20, and a combination of the ID management type card 10 and the ID management type reader/writer 20.

In the online payment processing (without synchronization), as illustrated in FIG. 12, first of all, any reader/writer 20 included in the above-described combinations requires a corresponding card 10 to acquire the ID 102 (Step S3000). The card 10 that has received a request from the reader/writer 20 transmits the ID 102 to the reader/writer 20 (Step S3004). The reader/writer 20 that has received the ID 102 from the card 10 transmits the ID 102 and current payment information to the first server 30 using the ID check function 206 (Step S3008). The first server 30 that has received the ID 102 and the current payment information determines a new value on the basis of the payment service information 304 associated with the ID 102 and the current payment information, using the ID-based payment function 302. Then, the first server 30 updates the payment service information 304 with the new value (Step S3012). After the update, the first server 30 transmits a payment result to the reader/writer 20 (Step S3016). Then, the information processing system ends the online payment processing (without synchronization).

Heretofore, an example of online payment processing (without synchronization) of the information processing system according to the present embodiment has been described with reference to FIG. 12. Subsequently, an example of online payment processing (with synchronization) of the information processing system according to the present embodiment will be described.

4.3. Online Payment Processing (With Synchronization)

Figure 13:
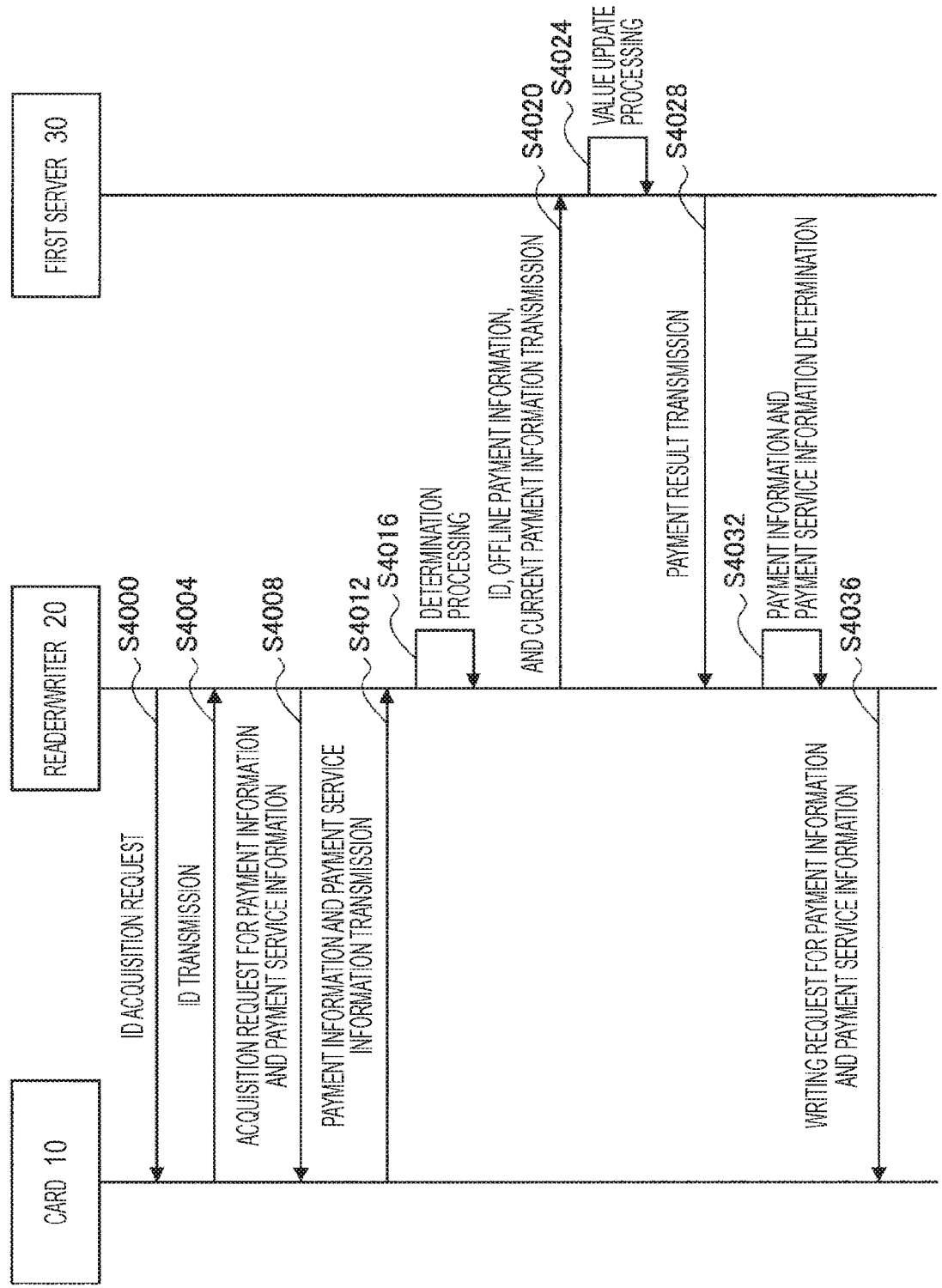
FIG. 13 is a sequence diagram illustrating an example of online payment processing (with synchronization) of the information processing system according to the embodiment.

Hereinafter, an example of online payment processing (with synchronization) of the information processing system according to the present embodiment will be described with reference to FIG. 13. FIG. 13 is a sequence diagram illustrating an example of online payment processing (with synchronization) of the information processing system according to the present embodiment. The online payment processing (with synchronization) can be applied to the combination of the hybrid-type card 10 and the hybrid-type reader/writer 20.

In the online payment processing (with synchronization), as illustrated in FIG. 13, first of all, the reader/writer 20 requires a corresponding card 10 to acquire the ID 102 (Step S4000). The card 10 that has received a request from the reader/writer 20 transmits the ID 102 to the reader/writer 20 (Step S4004). Furthermore, the reader/writer 20 requires a corresponding card 10 to acquire the payment service information 104 and the payment information 106 (Step S4008). The card 10 that has received a request from the reader/writer 20 transmits the payment service information 104 and the payment information 106 to the reader/writer 20 (Step S4012).

Here, the determination unit 234 of the reader/writer 20 performs determination processing of determining processing to be executed by the processing unit 232, on the basis of the information received in Steps S4000, S4004, S4008, and S4012 described above, and the state of the online environment (Step S4016).

In Step S4016, first of all, the determination unit 234 checks information acquired from an external device. In a case where the information includes service information and identification information, and processing that uses identification information regarding a service is in an executable state, the determination unit 234 determines processing to be executed by the processing unit 232, to be the processing that uses the service information, and the processing that uses the identification information regarding the service. Specifically, in a case where the determination unit 234 receives the payment service information 104 and the ID 102 from the card 10, and an online environment is in a usable state, the determination unit 234 determines processing to be executed by the processing unit 232, to be online payment processing. Note that because the processing unit 232 can execute both of the offline payment processing and the online payment processing, the processing unit 232 also executes synchronization processing of offline side payment service information and online side payment service information.

As described above, in a case where it is determined that the processing unit 232 is to execute the offline payment processing, the online payment processing, and the synchronization processing, first of all, the processing unit 232 checks whether or not payment processing has been executed in an offline state, on the basis of the service information received from the card 10 in Step S4012. For example, in a case where a payment log of the payment service information 104 includes a log indicating that the payment processing has been executed in the offline state, the processing unit 232 determines that the payment processing has been executed in the offline state. Furthermore, the processing unit 232 may check an offline payment value default value of the payment information 106, and in a case where the default value and a value of the payment service information 104 do not match, the processing unit 232 may determine that the payment processing has been executed in the offline state. In a case where it is determined that the payment processing has been executed in the offline state, by the above-described determination processing, the processing unit 232 transmits offline payment information indicating information regarding payment processing in an offline state, the current payment information, and the ID 102 to the first server 30 (Step S4020).

The first server 30 updates a value and a payment log of the payment service information 304 associated with the ID 102 received from the reader/writer 20, on the basis of the offline payment information and the current payment information (Step S4024). After the update processing, the first server 30 transmits a payment processing result to the reader/writer 20 (Step S4028).

The reader/writer 20 that has received a payment result determines update information of the payment information 106 included in the card 10, and an update value of a value of the payment service information 104, on the basis of the payment result (Step S4032). Then, the reader/writer 20 transmits a writing request to the card 10 to update the payment information 106 of the card 10 and a value of the payment service information 104 with the determined update information and update value (Step S4036). Then, after the card 10 executes the writing processing of the update information and the update value, the information processing system ends the online payment processing (with synchronization).

As described above, by the reader/writer 20 including a function of relaying the offline side card 10 and the online side first server 30, the card 10 and the first server 30 can recognize payment information of each other. Therefore, the card 10 and the first server 30 can achieve harmonization of payment information of each other. Therefore, the hybrid-type information processing system can perform synchronization processing of offline side payment information and online side payment information in the above-described manner.

Note that the above-described synchronization processing is processing implemented by the synchronization function 202 included in the hybrid-type reader/writer 20. Furthermore, the synchronization function 202 is a function operating only in the combination of the hybrid-type card 10 and the hybrid-type reader/writer 20.

Furthermore, in Step S4016, in a case where the acquired information includes service information and identification information, and processing that uses identification information regarding a service is in an inexecutable state, the determination unit 234 determines processing to be executed by the processing unit 232, to be only the processing that uses the service information. Specifically, in a case where the payment service information 104 and the ID 102 are received from the card 10, and an online environment is in an unusable state, the determination unit 234 determines processing to be executed by the processing unit 232, to be only offline payment processing.

Furthermore, in Step S4016, in a case where the acquired information includes only service information, the determination unit 234 determines processing to be executed by the processing unit 232, to be only the processing that uses the service information. Specifically, in a case where only the payment service information 104 is received from the card 10, the determination unit 234 determines processing to be executed by the processing unit 232, to be only offline payment processing.

As described above, in a case where it is determined that the processing unit 232 is to execute only the offline payment processing, the processing in Steps S4020, S4024, and S4028 is skipped. Then, on the basis of the payment service information 104 and the payment information 106 that have been received in Step S4012, the reader/writer 20 determines update information of the payment information 106 included in the card 10, and an update value of a value of the payment service information 104 (Step S4032). Then, the reader/writer 20 transmits a writing request to the card 10 to update the payment information 106 of the card 10 and a value of the payment service information 104 with the determined update information and update value (Step S4036). Then, after the card 10 executes the writing processing of the update information and the update value, the information processing system ends the offline payment processing.

Furthermore, in Step S4016, in a case where the acquired information includes only identification information, and processing that uses identification information regarding a service is in an executable state, the determination unit 234 determines processing to be executed by the processing unit 232, to be only the processing that uses the identification information regarding the service. Specifically, in a case where only the ID 102 is received from the card 10, and an online environment is in a usable state, the determination unit 234 determines processing to be executed by the processing unit 232, to be only online payment processing.

As described above, in a case where it is determined that the processing unit 232 is to execute only the online payment processing, the processing unit 232 transmits the current payment information and the ID 102 received from the card 10 in Step S4004, to the first server 30 (Step S4020).

The first server 30 updates a value and a payment log of the payment service information 304 associated with the ID 102 received from the reader/writer 20, on the basis of the current payment information (Step S4024). After the update processing, the first server 30 transmits a payment processing result to the reader/writer 20 (Step S4028). Then, the information processing system ends the online payment processing.

Heretofore, the online payment processing (with synchronization) of the information processing system according to the present embodiment has been described with reference to FIG. 13. Subsequently, a migration procedure of the information processing system according to the present embodiment will be described.

4.4. Migration Procedure

Figure 14:
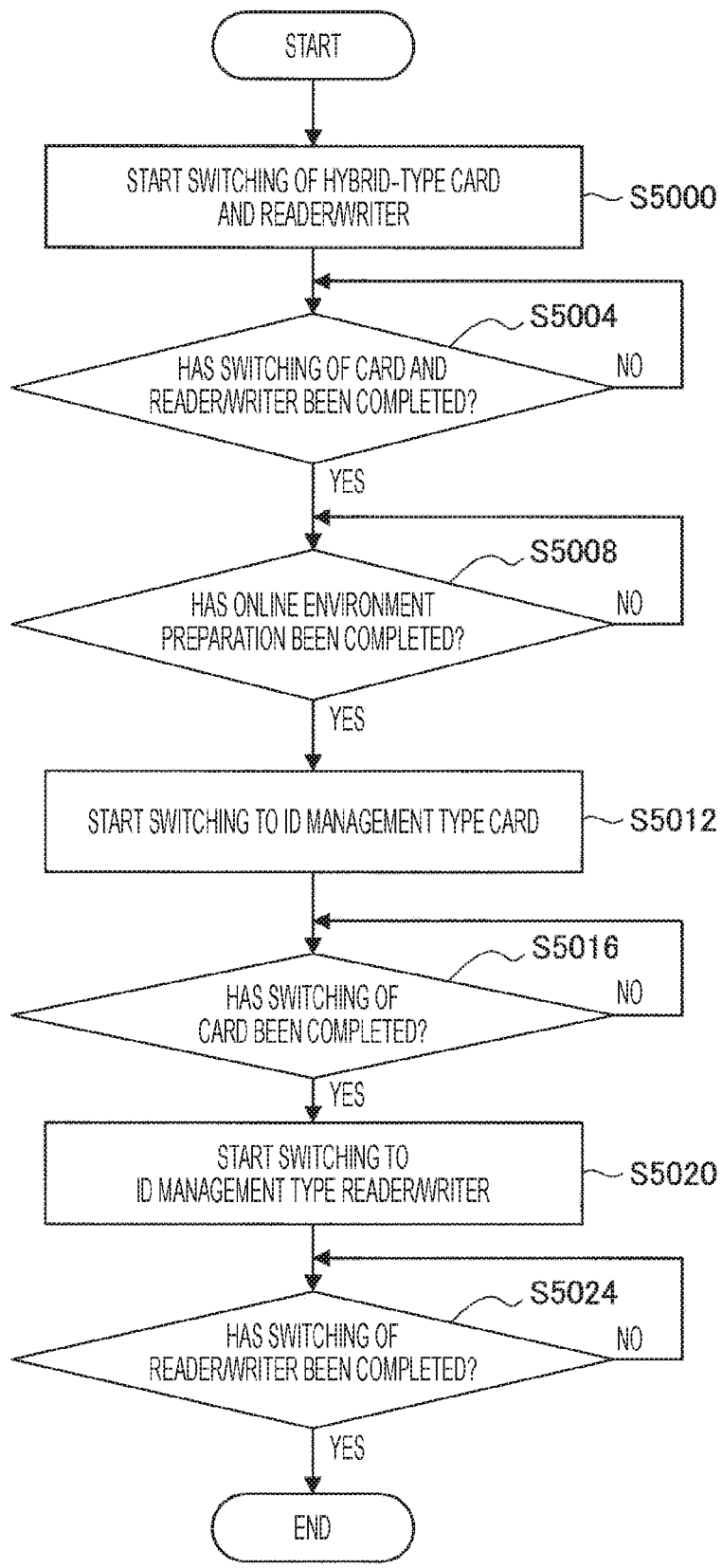
FIG. 14 is a flowchart illustrating a migration procedure of the information processing system according to the embodiment.

Hereinafter, a migration procedure of the information processing system according to the present embodiment will be described with reference FIG. 14. FIG. 14 is a flowchart illustrating a migration procedure of the information processing system according to the present embodiment.

In the migration according to the present embodiment, as illustrated in FIG. 14, first of all, switching from the value storage type card 10 and the value storage type reader/writer 20 to the hybrid-type card 10 and the hybrid-type reader/writer 20 is started (Step S5000).

In a case where switching to the hybrid-type card 10 and the hybrid-type reader/writer 20 has been completed (Step S5004/YES), it is confirmed whether or not the arrangement of an online environment has been completed (Step S5008). In a case where switching to the hybrid-type card 10 and the hybrid-type reader/writer 20 has not been completed (Step S5004/NO), a switching work from a value storage type to a hybrid type is continued.

In a case where the arrangement of an online environment has been completed (Step S5008/YES), switching from the hybrid type to the ID management type is performed. In a case where the arrangement of an online environment has not been completed (Step S5008/NO), an arrangement work of an online environment is continued.

After the arrangement of an online environment has been completed, on the basis of an invalidation instruction of the first function that has been issued by the first server 30 (transmission of an invalidation request), switching from the hybrid-type card 10 to the ID management type card 10 is started (Step S5012). By the first function being invalidated, the hybrid-type card 10 is switched to the ID management type card 10.

In a case where switching to the ID management type card 10 has been completed (Step S5016/YES), switching from the hybrid-type reader/writer 20 to the ID management type reader/writer 20 is started (Step S5020). In a case where switching to the ID management type card 10 has not been completed (Step S5016/NO), a switching work is continued.

After the switching to the ID management type card 10 has been completed, switching from the hybrid-type reader/writer 20 to the ID management type reader/writer 20 is started (Step S5020). By being replaced with a new device, the hybrid-type reader/writer 20 is switched to the ID management type reader/writer 20. Note that the hybrid-type reader/writer 20 may be switched to the ID management type reader/writer 20 by a function other than the second function being invalidated.

In a case where the switching to the ID management type reader/writer 20 has been completed (Step S5024/YES), the migration is ended. In a case where the switching to the ID management type reader/writer 20 has not been completed (Step S5024/NO), a switching work is continued.

In the above-described manner, migration from the value storage type card 10 and reader/writer 20 to the ID management type card 10 and reader/writer 20 is performed. Here, the invalidation of the first function of the hybrid-type card 10 in Step S5012 will be described. The invalidation of the first function of the hybrid-type card 10 is performed by the processing unit 132 of the hybrid-type card 10. The processing unit 132 invalidates the first function by changing the settings of the payment information 106 and the payment service information 104.

Specifically, the processing unit 132 deactivates the offline payment function flag of the payment information 106. Furthermore, the processing unit 132 sets values of the maximum amount limit of the offline payment of the payment information 106 and the offline payment value default value of the payment information 106, and a value of the payment service information 104 to 0. Therefore, because the payment information 106 of the hybrid-type card 10 and a value and a payment log of the payment service information 104 become unusable, the first function of performing processing that uses these pieces of information also becomes unusable. Therefore, the first function of the hybrid-type card 10 is invalidated, and the hybrid-type card 10 is switched to the ID management type card 10.

Note that a method of switching from the hybrid-type card 10 to the ID management type card 10 is not limited to a method of invalidating the first function. For example, the hybrid-type card 10 may be switched to the ID management type card 10 by being replaced with the ID management type card 10 not including the first function. Furthermore, the hybrid-type card 10 may be switched to the ID management type card 10 by the first function being deleted. Furthermore, the hybrid-type card 10 may be switched to the ID management type card 10 by a storage region of the payment service information 104 and the payment information 106 being deleted, and the first function being shifted to an unusable state. Furthermore, the hybrid-type card 10 may be switched to the ID management type card 10 by key information for accessing the payment service information 104 or the like being changed.

Heretofore, a migration procedure of the information processing system according to the present embodiment has been described with reference FIG. 14.

Heretofore, an operation example of the information processing system according to the present embodiment has been described with reference to FIGS. 11 to 14.

5. Conclusion

As described above, an information processing device (first information processing device) according to an embodiment of the present disclosure includes the first function of executing processing that uses service information stored in a recording medium, and the second function of executing processing that uses identification information regarding a service that is stored in a recording medium. Then, the information processing device can determine processing to be executed, on the basis of a request from an external device, and execute the processing. Furthermore, the first function is invalidated on the basis of an invalidation request from an external device.

As the result, because the information processing device can handle processing in any period of a period before migration, a period after migration, and a period during migration, a situation in which the user cannot use a service becomes less likely to be generated. Therefore, an information processing device and an information processing system that are novel and improved, and can smoothly perform the migration of a system can be provided.

Heretofore, a preferred embodiment of the present disclosure has been described in detail with reference to the attached drawings, but the technical scope of the present disclosure is not limited to this example. It should be appreciated that a person who has general knowledge in the technical field of the present disclosure can conceive various change examples and modified examples within the scope of the technical idea described in the appended claims, and these change examples and modified examples are construed as naturally falling within the technical scope of the present disclosure.

Furthermore, the processes described in this specification using the flowcharts and the sequence diagrams need not be always executed in the orders illustrated in the drawings. Some processing steps may be concurrently executed. Furthermore, an additional processing step may be employed, and a part of the processing steps may be omitted.

Note that the following configurations also fall within the technical scope of the present disclosure.

(1) An information processing device including:
a processing unit including a first function of executing processing that uses service information stored in a recording medium, and a second function of executing processing that uses identification information regarding a service that is stored in a recording medium; and
a determination unit configured to determine processing to be executed by the processing unit, on the basis of a request from an external device,
in which the processing unit executes processing determined on the basis of the request, and
the first function is invalidated on the basis of an invalidation request from an external device.

(2) The information processing device according to (1) described above, in which the first function is invalidated on the basis of setting information including a setting related to the processing that uses the service information.

(3) The information processing device according to (2) described above, in which the first function is invalidated by the setting information being changed on the basis of the invalidation request.

(4) The information processing device according to any one of (1) to (3) described above, in which the first function is invalidated for every service.

(5) An information processing device including:
a processing unit including a first function of executing processing that uses service information stored in a communication target external device, and a second function of executing processing that uses identification information regarding a service that is stored in the external device; and
a determination unit configured to determine processing to be executed by the processing unit, on the basis of information acquired from the external device,
in which the processing unit executes processing determined on the basis of the acquired information.

(6) The information processing device according to (5) described above, in which, in a case where the information acquired from the external device includes the service information and the identification information, and the processing that uses the identification information regarding the service is in an executable state, the determination unit determines processing to be executed by the processing unit, to be the processing that uses the service information, and the processing that uses the identification information regarding the service.

(7) The information processing device according to (5) or (6) described above, in which, in a case where the information acquired from the external device includes the service information and the identification information, and the processing that uses the identification information regarding the service is in an inexecutable state, the determination unit determines processing to be executed by the processing unit, to be only the processing that uses the service information.

(8) The information processing device according to any one of (5) to (7) described above, in which, in a case where the information acquired from the external device includes only the service information, the determination unit determines processing to be executed by the processing unit, to be only the processing that uses the service information.

(9) The information processing device according to any one of (5) to (8) described above, in which, in a case where the information acquired from the external device includes only the identification information, and the processing that uses the identification information regarding the service is in an executable state, the determination unit determines processing to be executed by the processing unit, to be only the processing that uses the identification information regarding the service.

(10) An information processing system including: a first information processing device; and a second information processing device,
in which the first information processing device includes
a first processing unit including a first function of executing processing that uses service information stored in a recording medium, and a second function of executing processing that uses identification information regarding a service that is stored in a recording medium, and a first determination unit configured to determine processing to be executed by the first processing unit, on the basis of a request from an external device, the first processing unit executes processing determined on the basis of the request, the first function is invalidated on the basis of an invalidation request from an external device, the second information processing device includes a second processing unit including a first function of executing processing that uses service information stored in a communication target external device, and a second function of executing processing that uses identification information regarding a service that is stored in the external device, and a second determination unit configured to determine processing to be executed by the second processing unit, on the basis of information acquired from the external device, and the second processing unit executes processing determined on the basis of the acquired information.

(11) An information processing system including: a first information processing device; and a second information processing device, in which the first information processing device includes a first processing unit including a first function of executing processing that uses service information stored in a recording medium, and a second function of executing processing that uses identification information regarding a service that is stored in a recording medium, the first function is invalidated, and the second information processing device includes a second processing unit including a function of executing processing that uses identification information regarding a service that is stored in a communication target external device.

REFERENCE SIGNS LIST

10 Card
20 Reader/writer
30 First server
40 Second server
120 Communication unit
130 Control unit
132 Processing unit
134 Determination unit
140 Storage unit
200 Reader/writer
220 Communication unit
230 Control unit
232 Processing unit
234 Determination unit
240 Storage unit

The invention claimed is:

1. An information processing device, comprising:
circuitry configured to:
receive a first request from a first external device;
change setting information based on the first request, wherein
the setting information indicates a setting of a specific service associated with service information of the information processing device, and
the service information is stored in a recording medium;
determine, one of a first processing or a second processing, as a processing to be executed based on the received first request;
invalidate the first processing based on the change of the setting information,
wherein the first processing includes transmission of the service information;
receive, from a second external device, a second request for an offline process, wherein the first external device is different from the second external device;
transmit a notification to the second external device based on the invalidation of the first processing, wherein the notification indicates that the offline process cannot be executed by the information processing device; and
execute the second processing based on the determined processing, wherein
the second processing is associated with identification information that is stored in the recording medium, and
the identification information is regarding the specific service.

2. The information processing device according to claim 1, wherein the circuitry is further configured to invalidate the first processing for each of a plurality of services associated with the information processing device.

3. An information processing device, comprising:
circuitry configured to:
acquire information from a communication target external device;
determine processing to be executed, wherein
the processing to be executed corresponds to a first processing and a second processing,
the first processing includes an offline payment processing based on service information stored in the communication target external device,
the service information indicates at least one of a value or a payment log associated with a payment process,
the payment process is associated with the information processing device,
the second processing includes an online payment processing based on identification information is stored in the communication target external device,
the identification information is regarding a service, and
the processing to be executed is determined based on the second processing that is in an executable state and the acquired information that includes the service information and the identification information;
execute the first processing and the second processing based on the determined processing;
determine, based on a comparison of the value associated with the payment process with a default payment value, that the first processing is executed;
determine an updated value of the value associated with the payment process based on the determination that the first processing is executed; and
send a request to the communication target external device to store the updated value associated with the payment process.

4. An information processing system, comprising:
a first information processing device; and
a second information processing device, wherein
the first information processing device includes first circuitry,
the first circuitry is configured to:
receive a first request from a first external device;
change setting information based on the first request, wherein the setting information indicates a setting of a first service associated with first service information of the first information processing device, and the first service information is stored in a recording medium;

determine, one of a first processing or a second processing, as a processing to be executed by the first information processing device based on the received first request;

invalidate the first processing based on the change of the setting information, wherein the first processing includes transmission of the first service information;

receive a second request from a second external device for an offline process,
wherein the first external device is different from the second external device;

transmit a notification to the second external device based on the invalidation of the first processing, wherein the notification indicates that the offline process cannot be executed by the first information processing device; and execute the second processing based on the determined processing to be executed by the first information processing device, the second processing is associated with first identification information stored in the recording medium, the first identification information is regarding the first service, the second information processing device includes second circuitry, and the second circuitry is configured to:
acquire information from a communication target external device;
determine, one of a third processing or a fourth processing, as a processing to be executed by the second information processing device wherein
the third processing is associated with second service information stored in the communication target external device,
the fourth processing is associated with second identification information stored in the communication target external device,
the second identification information is regarding a second service, and
the processing to be executed by the second information processing device is determined based on the third processing that is in an executable state and the acquired information that includes the second service information and the second identification information; and
execute the third processing and the fourth processing based on the determined processing to be executed by the second information processing device.

5. An information processing system, comprising:
a first information processing device; and
a second information processing device, wherein
the first information processing device includes circuitry configured to:
receive a first request from a first external device;
change setting information based on the first request, wherein the setting information indicates a setting of a first service associated with service information of the information processing device stored in a recording medium;
determine, one of a first processing or a second processing, as a processing to be executed based on the received first request;
invalidate the first processing based on the change of the setting information, wherein the first processing includes transmission of the service information;
receive a second request from a second external device for an offline process, wherein the first external device is different from the second external device;
transmit a notification to the second external device based on the invalidation of the first processing, wherein the notification indicates that the offline process cannot be executed by the first information processing device; and
execute the second processing based on the determined processing, wherein
the second processing is associated with identification information stored in the recording medium, and
the identification information is regarding the first service,
the second information processing device includes second circuitry configured to execute a third processing based on second identification information stored in a communication target external device, and
the second identification information is regarding a second service.

6. The information processing device according to claim 1, wherein the setting information comprises an offline payment function flag that indicates whether the first processing is invalidated.

7. The information processing device according to claim 6, wherein the circuitry is further configured to determine one of an activated state of the offline payment function flag or a deactivated state of the offline payment function flag.

8. The information processing device according to claim 7, wherein the circuitry is further configured to determine the first processing is invalidated based on the determination of the deactivated state of the offline payment function flag.

9. The information processing device according to claim 1, wherein the second processing includes transmission of the identification information for an online process.

* * * * *